(12) United States Patent
Aikawa et al.

(10) Patent No.: US 6,807,820 B2
(45) Date of Patent: Oct. 26, 2004

(54) HEAT STORAGE SYSTEM FOR VEHICLE, WITH ADSORBENT

(75) Inventors: Yasukazu Aikawa, Nagoya (JP); Takahisa Suzuki, Kariya (JP); Satoshi Inoue, Kariya (JP); Hideaki Sato, Anjo (JP); Hiroshi Mieda, Kariya (JP)

(73) Assignee: Denso Corporation, Kariya (JP)

( * ) Notice: Subject to any disclaimer, the term of this patent is extended or adjusted under 35 U.S.C. 154(b) by 107 days.

(21) Appl. No.: 10/366,805

(22) Filed: Feb. 14, 2003

(65) Prior Publication Data

US 2003/0167925 A1 Sep. 11, 2003

(30) Foreign Application Priority Data

| Mar. 6, 2002 | (JP) | ............................... 2002-060734 |
| Jun. 24, 2002 | (JP) | ............................... 2002-182869 |

(51) Int. Cl.$^7$ ................................ F25B 27/00
(52) U.S. Cl. .................. 62/238.3; 62/238.6; 62/476
(58) Field of Search .................. 62/101, 238.3, 62/238.6, 244, 476, 480; 165/104.12; 237/2

(56) References Cited

U.S. PATENT DOCUMENTS

| 4,161,211 A | * | 7/1979 | Duffy et al. ............ 165/104.12 |
| 4,924,676 A | * | 5/1990 | Maier-Laxhuber et al. .... 62/59 |
| 5,142,884 A | * | 9/1992 | Scaringe et al. ............ 62/324.4 |
| 5,518,069 A | * | 5/1996 | Maier-Laxhuber et al. ...... 165/104.12 |

FOREIGN PATENT DOCUMENTS

| JP | 1-267346 | | 10/1989 | | |
| JP | 403129266 A | * | 6/1991 | .................. | 62/480 |
| JP | 405099538 A | * | 4/1993 | .................. | 62/476 |
| JP | 6-17648 | | 1/1994 | | |

* cited by examiner

Primary Examiner—Melvin Jones
(74) Attorney, Agent, or Firm—Harness, Dickey & Pierce, PLC

(57) ABSTRACT

In a heat storage system for a vehicle, when a temperature of cooling water from a vehicle engine is high, adsorbents are heated by the cooling water, so that moisture is desorbed from the adsorbents in order to store heat. When the temperature of cooling water is low, the moisture is adsorbed in the adsorbents to heat the cooling water, while refrigerant in a vapor compression refrigerator is cooled by evaporating water. Thus, adsorption heat is generated from the adsorbents, and the cooling water is heated by using the adsorption heat. Accordingly, warm-up operation of the vehicle engine is facilitated, while motive power consumed by the vapor compression refrigerator can be reduced.

22 Claims, 28 Drawing Sheets

HEAT STORAGE MODE

AUXILIARY-COOLING PRIORITY MODE

COLD STORAGE MODE

COLD PRE-RELEASE MODE

COLD STORAGE MODE

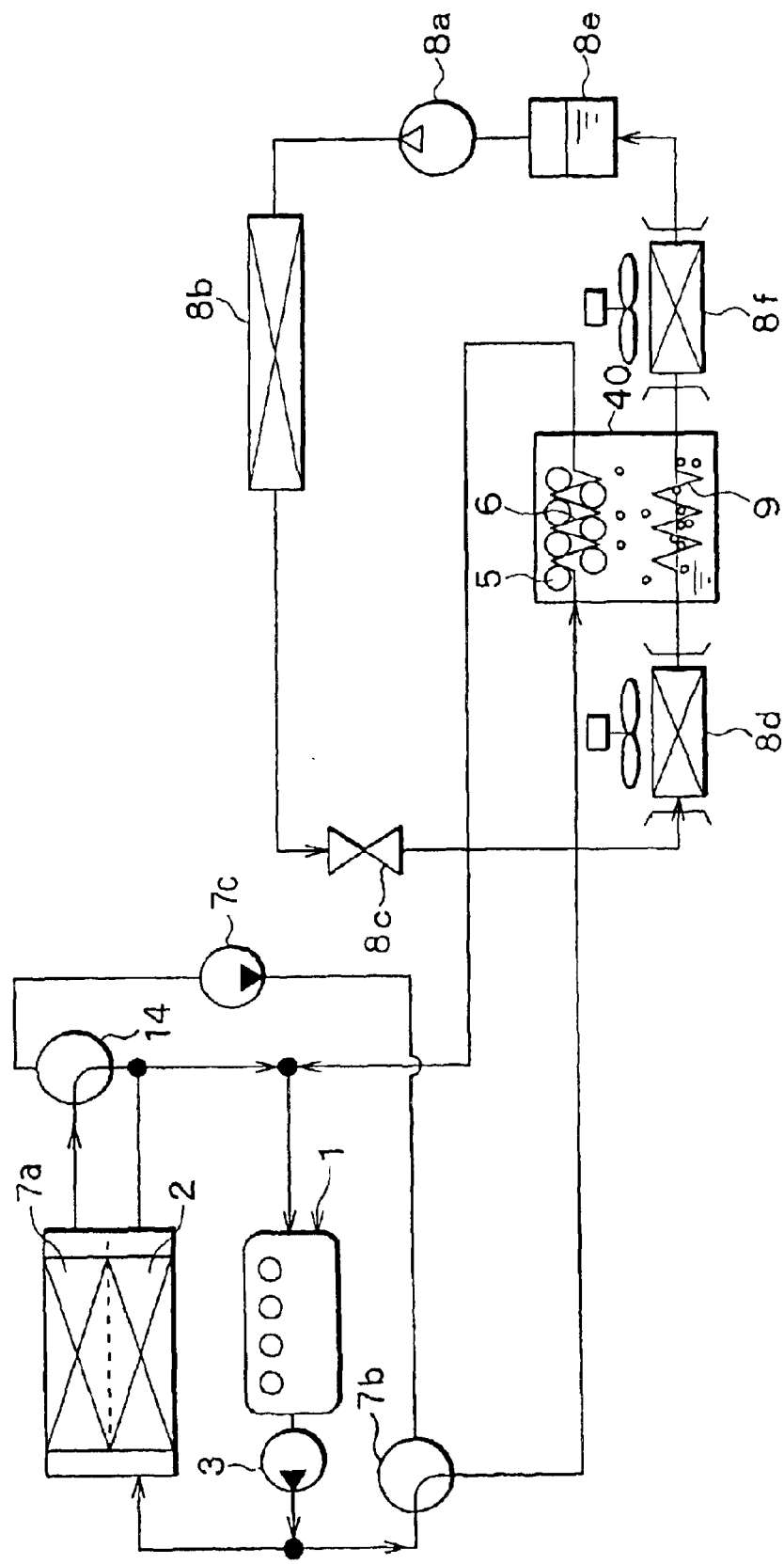

COLD RELEASE MODE

FIG. 23 COLD STORAGE MODE

COLD RELEASE MODE

HEAT STORAGE SYSTEM FOR VEHICLE, WITH ADSORBENT

CROSS-REFERENCE TO RELATED APPLICATION

This application is related to and claims priority from Japanese Patent Applications No. 2002-60734 filed on Mar. 6, 2002 and No. 2002-182869 filed on Jun. 24, 2002, the contents of which are hereby incorporated by reference.

BACKGROUND OF THE INVENTION

1. Field of the Invention

The present invention relates to a heat storage system for a vehicle, which stores heat by using waste heat from the vehicle. The heat storage system includes an adsorbent for adsorbing and desorbing a medium. The heat storage system is suitably used for a heating system of a vehicle engine, and is also suitably used for a vehicle air conditioner.

2. Description of Related Art

In a system disclosed in JP-A-1-267346, waste heat, generated in traveling of a vehicle, is chemically absorbed while reaction gas is emitted, so that the waste heat is chemically stored. When operation of a vehicle engine is started, the reaction gas is adsorbed, so that the chemically stored heat is emitted to enhance warm-up operation of the vehicle engine. However, the system is only for performing the warm-up operation, and the absorption heat (stored heat) is not effectively used.

SUMMARY OF THE INVENTION

In view of the foregoing problems, it is an object of the present invention to provide a heat storage system for a vehicle, which can effectively use adsorption heat.

It is another object of the present invention to improve fuel-consumption efficiency when the heat storage system including a refrigerator is used for a vehicle air conditioner.

According to the present invention, in a heat storage system for a vehicle, an adsorbent for adsorbing and desorbing medium has a medium-adsorbing capacity that is reduced in accordance with a temperature increase of the adsorbent, and generates heat when adsorbing gas medium. The heat storage system includes an adsorption chamber for containing the adsorbent therein, a waste heat supplier that supplies waste heat generated in the vehicle to the adsorbent, an adsorption heat supplier that supplies the heat generated by the adsorbent to an apparatus requiring warm-up operation, and a refrigerator for cooling air to be blown into a passenger compartment of a vehicle. The refrigerator includes a refrigerant-medium heat exchanger for performing heat-exchange between the medium and refrigerant circulated in the refrigerator. In addition, the heat storage system includes a first valve for opening and closing a first passage through the gas medium desorbed from the adsorbent is introduced from the adsorption chamber to the refrigerant-medium heat exchanger, a liquid-medium storage chamber for storing liquid medium cooled and condensed in the refrigerant-medium heat exchanger, and a second valve for opening and closing a second passage through which the liquid-medium storage chamber and the adsorption chamber communicate with each other. Here, the liquid medium is heated and vaporized to be gas medium in the refrigerant-medium heat exchanger by absorbing heat. In the heat storage system, the first valve opens the first passage for a predetermined time when a temperature of the apparatus is equal to or higher than a predetermined temperature, and closes the first passage after the predetermined time passes. Further, the second valve opens the second passage at least when the temperature of the apparatus is lower than the predetermined temperature.

Accordingly, when the first valve opens the first passage, the adsorbent is heated, and the medium adsorbed on the adsorbent is desorbed from the adsorbent. Therefore, the desorbed medium flows to the refrigerant-medium heat exchanger, so that the waste heat is chemically stored as the liquid medium. When the second valve is opened, the refrigerant in the refrigerator is cooled while the chemically stored heat is supplied to the apparatus as adsorption heat. Thus, the waste heat is chemically stored by using an adsorption function of the adsorbent. When the temperature of the apparatus is low as in warm-up operation of the apparatus, motive power consumed by the refrigerator can be reduced while the warm-up operation is enhanced by supplying the adsorption heat to the apparatus. Therefore, the adsorption heat can be effectively used.

Preferably, the refrigerant-medium heat exchanger performs heat-exchange between the refrigerant and the liquid medium stored in the liquid-medium storage chamber when the second valve opens the second passage. Therefore, liquid medium in the liquid-medium storage chamber absorbs heat from the refrigerant through the refrigerant-medium heat exchanger, and is continuously evaporated.

More preferably, the heat storage system includes an adsorbent cooling unit that cools the adsorbent when the second valve opens the second passage. Therefore, consumed power in the refrigerator can be reduced in long time. Here, a radiation portion of the adsorbent cooling unit can be integrated with a radiator for performing a heat exchange between cooling water circulating in the apparatus and outside air.

For example, in a heat storage system, the refrigerant-medium heat exchanger is disposed to cool the refrigerant in the refrigerator through the medium in a cooling mode. Therefore, cooling capacity of the refrigerator can be increased without increasing the rotation speed of a driving device of the refrigerator. Thus, cooling capacity for cooling the passenger compartment can be improved while fuel consumption efficiency can be improved, when the heat storage system is used for a vehicle air conditioner.

Specifically, the refrigerant-medium heat exchanger is disposed to cool refrigerant at a low pressure side after being decompressed in the refrigerator in the cooling mode. For example, when the refrigerator includes at least two heat exchangers at the low pressure side, the refrigerant-medium heat exchanger is disposed in a refrigerant passage connecting the two heat exchangers to cool refrigerant flowing in the refrigerant passage. In this case, the two heat exchangers and the refrigerant-medium heat exchanger can be integrated with each other, or can be disposed separately from each other.

Alternatively, the refrigerant-medium heat exchanger is disposed to cool refrigerant at a high pressure side before being decompressed in the refrigerator, in the cooling mode. In this case, because the refrigerant pressure at the high pressure side can be reduced, the enthalpy and the dryness of refrigerant at an inlet of a low-pressure side heat exchanger can be reduced, and the cooling capacity of the refrigerator can be effectively improved.

BRIEF DESCRIPTION OF THE DRAWINGS

Additional objects and advantages of the present invention will be more readily apparent from the following detailed description of preferred embodiments when taken together with the accompanying drawings, in which:

FIG. 21 is a schematic diagram showing a heat storage system in the cold storage mode, according to a tenth embodiment of the present invention;

DETAILED DESCRIPTION OF THE PRESENTLY PREFERRED EMBODIMENTS

Preferred embodiments of the present invention will be described hereinafter with reference to the appended drawings.

(First Embodiment)

Figure 1:
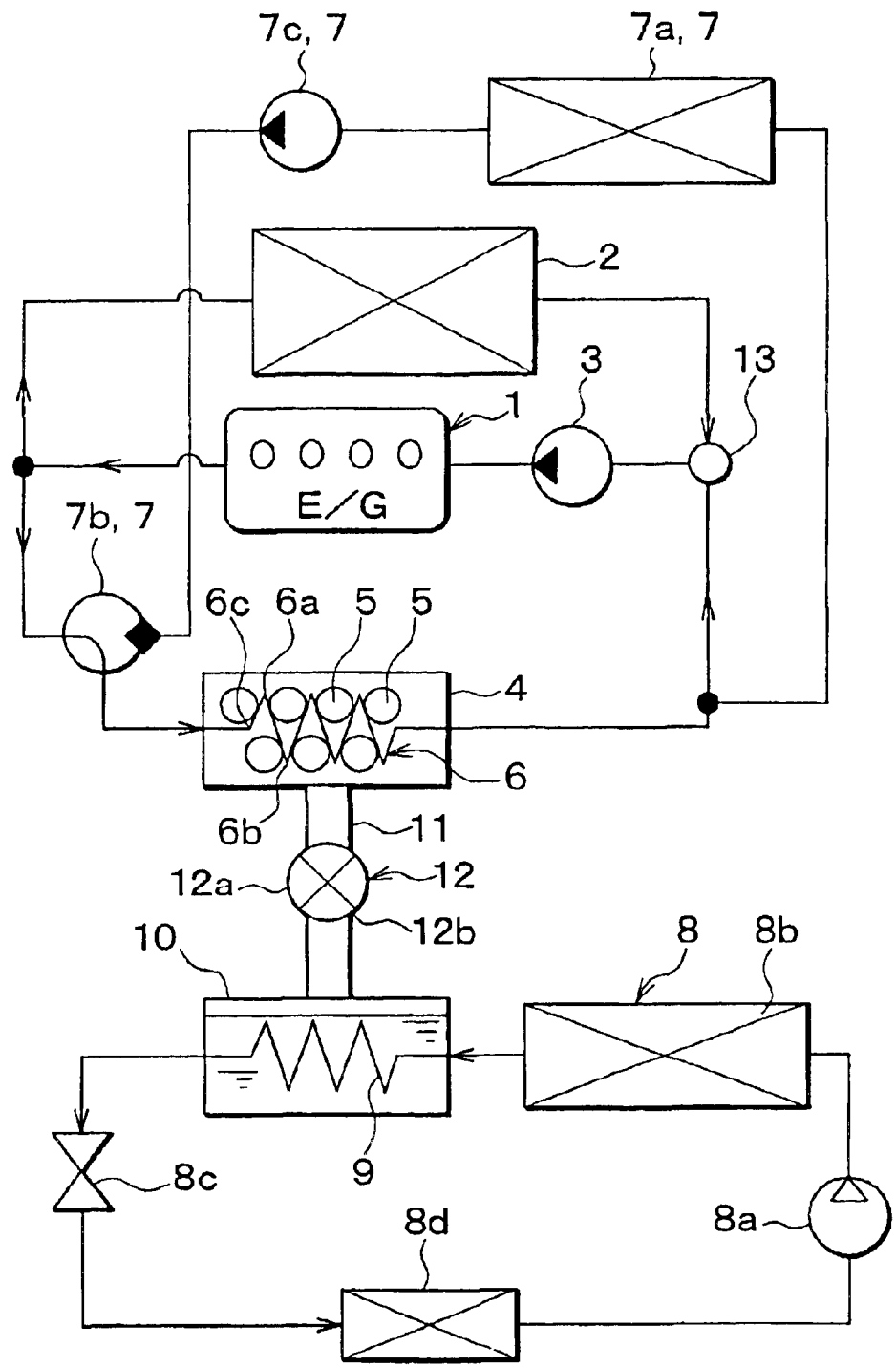
FIG. 1 is a schematic diagram showing a heat storage system according to a first embodiment of the present invention.

In the first embodiment, the present invention is typically applied to a vehicle including an internal combustion engine, and a heat storage system for a vehicle according to the first embodiment is schematically shown in FIG. 1. An engine 1 is an internal combustion engine that is used as a drive source for driving the vehicle, and a radiator 2 cools cooling water having circulated in the engine 1 by performing heat-exchange between outside air and the cooling water from the engine 1. A pump 3 circulates the cooling water by using motive power obtained from the engine 1.

An adsorption core 6, including adsorbents 5 adhered to a surface thereof, is disposed in an adsorption chamber 4. As a temperature of the adsorbent 5 increases, an amount of medium capable of being adsorbed on the adsorbent 5 (medium-adsorbing capacity of the adsorbent 5) is reduced. Further, when vaporized medium (gas medium) is adsorbed on the adsorbent 5, the adsorbent 5 generates heat. In the first embodiment, water is used as the medium, and a moisture adsorbent such as a silica gel and a zeolite is used as the adsorbent 5. When the adsorbent 5 is heated to a predetermined high temperature, the medium-adsorbing capacity of the adsorbent 5 reduces to a capacity at the predetermined high temperature. That is, when the adsorbent 5 is heated, the medium is desorbed from the adsorbent 5, so that an adsorbed amount of the medium becomes an amount capable of being adsorbed on the adsorbent 5 at the heated temperature. On the other hand, when the adsorbent 5 is cooled to a predetermined low temperature, the medium-adsorbing capacity of the adsorbent 5 increases to a capacity at the predetermined low temperature. That is, when the adsorbent 5 is cooled, the medium is adsorbed on the adsorbent 5, and an adsorbed amount of medium becomes an amount capable of being adsorbed on the adsorbent 5 at the cooled temperature.

The adsorbent 5 generates adsorption heat equivalent to condensation heat of gas medium (moisture) when adsorbing gas medium. The adsorption heat is equal to the sum of the condensation heat and a. Here, an absorbable medium amount of the adsorbent 5 is changed due to a temperature change of the adsorbent 5, even in the same relative humidity. The adsorption core 6 is a heat exchanger for performing heat-exchange between cooling water flowing in the adsorption core 6 and the adsorbents 5. When a temperature of the cooling water flowing in the adsorption core 6 is higher than the temperature of the adsorbents 5, the adsorption core 6 functions as a waste heat supplier 6a for supplying exhaust heat of the engine 1 to the adsorbents 5. On the contrary, when the temperature of cooling water flowing in the adsorption core 6 is lower than the temperature of the adsorbents 5, the adsorption core 6 functions as an adsorption heat supplier 6b for supplying heat to the engine 1. In an auxiliary-cooling priority mode described later, the adsorption core 6 functions as a cooling portion 6c for cooling the adsorbents 5.

A heat storage radiator 7a cools the adsorbents 5 by performing heat-exchange between cooling water flowing in the heat storage radiator 7a from the adsorption core 6 and outside air. A switching valve 7b switches any one of a stream direction of cooling water from the heat storage radiator 7a to the adsorption core 6 and a stream direction of cooling water from the engine 1 to the adsorption core 6. A pump 7c electrically circulates cooling water between the heat storage radiator 7a and the adsorption core 6. Thus, an adsorbent cooling unit 7 for cooling the adsorbents 5 is constructed of the heat storage radiator 7a, the switching valve 7b, the pump 7c and the adsorption core 6, for example.

A vapor compression refrigerator 8 is constructed of a compressor 8a, a condenser 8b, an expansion valve 8c, an evaporator 8d and the like, and cools air to be blown into a passenger compartment. Refrigerant discharged from the compressor 8a has a high temperature and high pressure, and is cooled to be condensed by outside air in the condenser 8b. The condensed refrigerant is decompressed and expanded by the expansion valve 8c to a low temperature and low pressure, and is evaporated in the evaporator 8d by absorbing heat from air to be blown into the passenger compartment. Therefore, air blown into the passenger compartment is cooled. Further, a condensation core 9 used as a refrigerant-medium heat exchanger is provided between the condenser 8b and the expansion valve 8c in a refrigerant circuit of the vapor compression refrigerator 8. The condensation core 9 performs heat exchange between refrigerant and the medium stored in the liquid-medium storage chamber 10 that communicates with the adsorption chamber 4. In the liquid-medium storage chamber 10, the medium is cooled to be condensed by the condensation core 9, and the condensed medium is stored.

Further, a valve 12 is provided in a communication passage 11 connecting the liquid-medium storage chamber 10 and the adsorption chamber 4, and opens and closes the communication passage 11. The valve 12 includes a first valve 12a and a second valve 12b. The first valve 12a controls whether gas medium desorbed from the adsorbents 5 is introduced to the condensation core 9 or not. On the other hand, the second valve 12b controls a medium stream from the liquid-medium chamber 10 to the adsorption chamber 4. In the first embodiment, the first valve 12a and the second valve 12b are integrated to each other to form the single valve 12 having the functions of both the first and second valves 12a, 12b.

A switching valve 13 switches any one of a cooling water flow from the engine 1 to only the radiator 2 and a cooling water flow from the engine 1 to both of the adsorption core 6 and the radiator 2. In FIG. 1, a bypass circuit and a flow amount valve such as a thermostat are omitted to simply show the drawing. Cooling water bypassing the radiator 2 flows into the bypass circuit, and returns to the engine 1. Further, the thermostat adjusts a flow amount of cooling water flowing through the bypass circuit.

Figure 2:
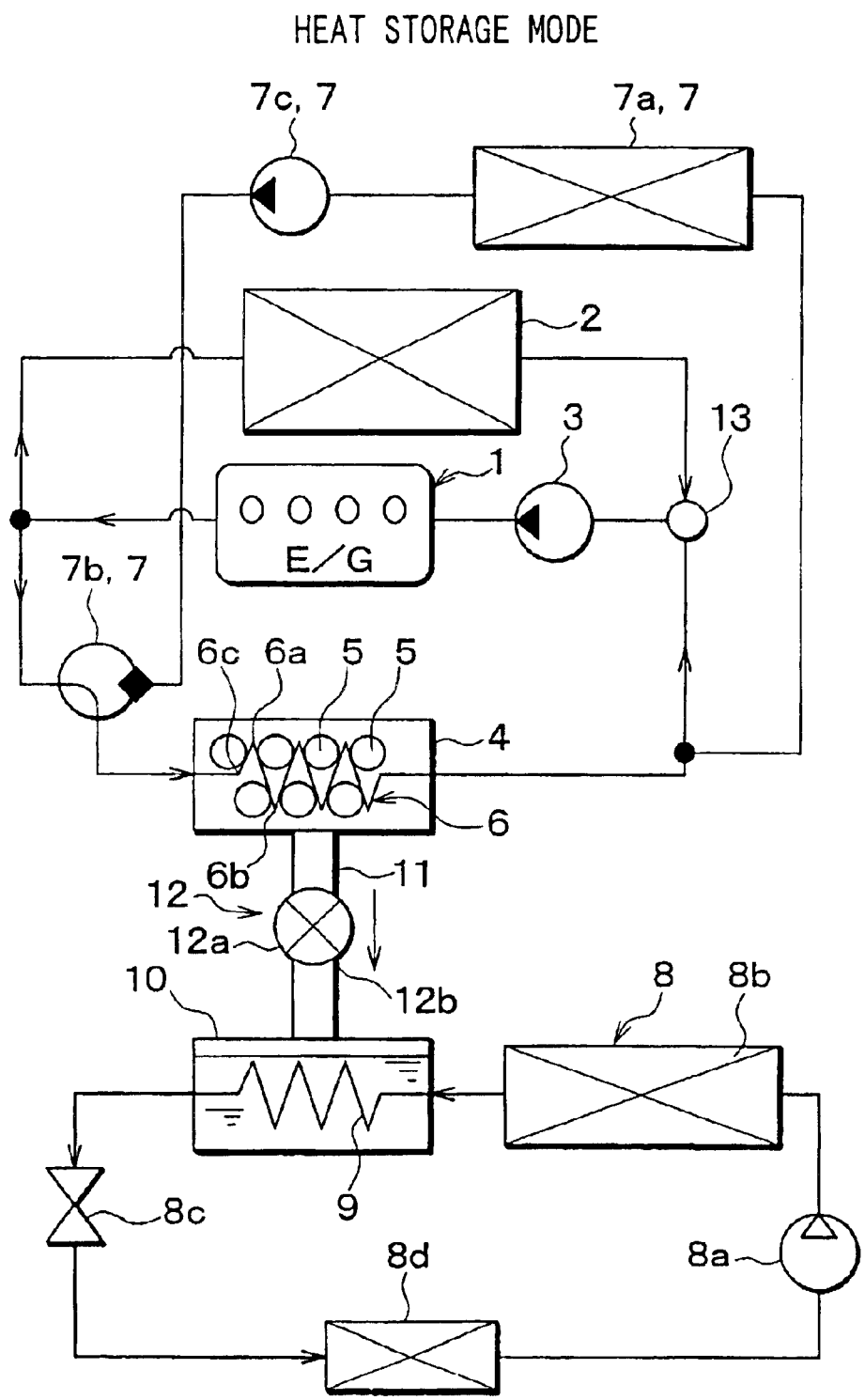
FIG. 2 is a schematic diagram showing the heat storage system in a heat storage mode, according to the first embodiment.

Next, operation and operational effects according to the first embodiment will be described. A heat storage mode, shown in FIG. 2, is performed when the temperature of cooling water from the engine 1 becomes equal to or higher than a predetermined temperature (e.g., 80–90° C.) where warm-up operation of the engine 1 is determined to be ended. Specifically, in the heat storage mode, the valve 12a is opened for a predetermined time while the engine 1 and the vapor compression refrigerator 8 are operated, and the valve 12a is closed after the predetermined time passes. Since high-temperature cooling water from the engine 1 flows in the adsorption core 6, the adsorbents 5 absorb exhaust heat of the engine 1, and the adsorbed medium is desorbed from the adsorbents 5 as gas medium.

At this time, an atmospheric temperature in the adsorption chamber 4 is in a temperature range (e.g., 80–90° C.) corresponding to the cooling water temperature from the engine 1, and an atmospheric temperature in the liquid-medium storage chamber 10 is in a temperature range (e.g., 40–60° C.) corresponding to a refrigerant temperature from the condenser 8b. The atmospheric temperature in the liquid-medium storage chamber 10 is lower than the atmospheric temperature in the adsorption chamber 4. Therefore, the medium desorbed from the adsorbents 5 flows into the liquid-medium storage chamber 10, and is cooled to be condensed by the condensation core 9. Then, the condensed medium is stored as liquid medium in the liquid-medium storage chamber 10. Heat, supplied to refrigerant through the condensation core 9, is finally radiated to atmospheric air through the condenser 8b of the refrigerator. In the heat storage mode, an opening time of the valve 12a is a time required for desorbing approximate all of medium adsorbed on the adsorbents 5, at the temperature of cooling water from the engine 1. The opening time is suitably determined based on the medium-adsorbing capacity of the adsorbent 5.

Figure 3:
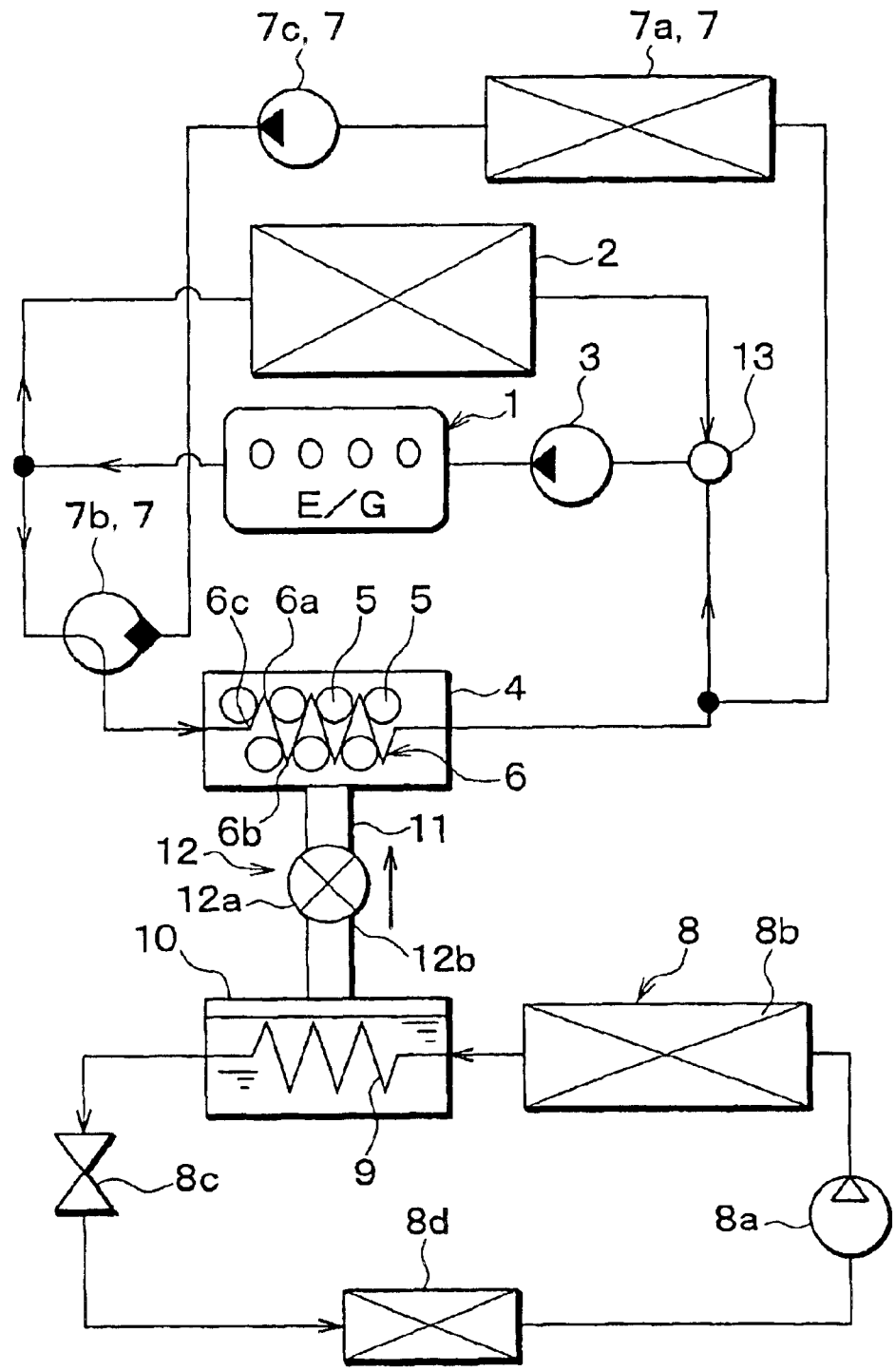
FIG. 3 is a schematic diagram showing the heat storage system in a warm-up/auxiliary-cooling mode, according to the first embodiment.

A warm-up/auxiliary-cooling mode, shown in FIG. 3, is performed when the temperature of cooling water from the engine 1 becomes lower than the predetermined temperature (e.g., 80–90° C.). Especially, the warm-up/auxiliary-cooling mode is performed at an engine cold start where operation of the engine 1 is started at a low temperature. Specifically, the valve 12b is opened while the engine 1 is operated. In this case, since low-temperature cooling water flows in the adsorption core 6, the adsorbents 5 adsorb gas medium in the adsorption chamber 4, and generate adsorption heat. Then, the cooling water, flowing in the adsorption core 6, is heated by the generated adsorption heat. Therefore, the temperature of the cooling water returning to the engine 1 is increased, and the warm-up operation of the engine 1 is facilitated.

At this time, since the adsorbents 5 adsorb the gas medium in the adsorption chamber 4, the pressure in the adsorption chamber 4 reduces than the pressure in the liquid-medium storage chamber 10. In this condition, when the vapor compression refrigerator 8 is operated, the atmospheric temperature in the liquid-medium storage chamber 10 becomes a temperature range (e.g., 40–60° C.) corresponding to the refrigerant temperature from the condenser 8b, and the atmospheric temperature in the adsorption chamber 4 is a temperature range (e.g., 25° C.) corresponding to an outside air temperature. Therefore, the liquid medium in the liquid-medium storage chamber 10 adsorbs heat from the refrigerant, and continues vaporization.

Thus, high-pressure refrigerant from the condenser 8b is cooled by using this medium vaporization in the liquid-medium storage chamber 10. Therefore, the high-pressure refrigerant can be cooled as compared with a vapor compression refrigerator which does not include the condensation core 9, and enthalpy (dryness) of refrigerant at an inlet of the evaporator 8d can be reduced, thereby improving cooling performance of the vapor compression refrigerator 8. Thus, the pressure of refrigerant discharged from the compressor 8a reduces. Accordingly, motive power consumed by the compressor 8a, that is, a load of the engine 1 is reduced, and motive power required by the vapor compression refrigerator 8 can be reduced.

As described above, in the first embodiment, when the temperature of cooling water is high, the waste heat of the engine 1 is stored as evaporation latent heat (similar to condensation heat) of the medium by using the adsorption function of the adsorbents 5. On the other hand, when the temperature of cooling water is low, for example, at the warm-up operation of the engine 1, the medium is adsorbed on the adsorbents 5, and the adsorption heat (equivalent to condensation heat) of the medium is generated. Since the generated adsorption heat is supplied to cooling water, the warm-up operation of the engine 1 is facilitated. Additionally, air-cooling performance can be improved in the refrigerator 8, while the motive power consumed by the vapor compression refrigerator 8 can be reduced. In the first embodiment, water is used as the medium, and the evaporation latent heat of water is large (2500 kilo joules/kilo gram). Therefore, a size of a heat storage unit, which is constructed with the adsorption chamber 4 and the liquid-medium storage chamber 10, can be reduced.

Further, the valve 12 can be maintained at an open state after the warm-up operation of the engine 1 is ended. For example, when the vehicle is stopped in idling operation of the engine 1, a rotational speed of the engine 1 and an air volume are reduced as compared with that in a vehicle travelling, and a thermal load of the vapor compression refrigerator 8 is reduced. Therefore, the cooling performance of the condenser 8b is reduced. However, in this case, when the valve 12 is in the open state after the warm-up operation of the engine 1 is ended, the load of the engine 1 is reduced, and the temperature of cooling water is reduced. Therefore, the warm-up/auxiliary-cooling mode is automatically set, and the temperature of cooling water is prevented from being excessively reduced while motive power consumed by the vapor compression refrigerator 8 is reduced.

On the other hand, when the vehicle travels, the load of the engine 1 increases, and the temperature of cooling water increases, so that the heat storage mode is automatically set. Accordingly, any one of the warm-up/auxiliary-cooling mode and the heat storage mode can be automatically selected without a specific switching device.

Figure 4:
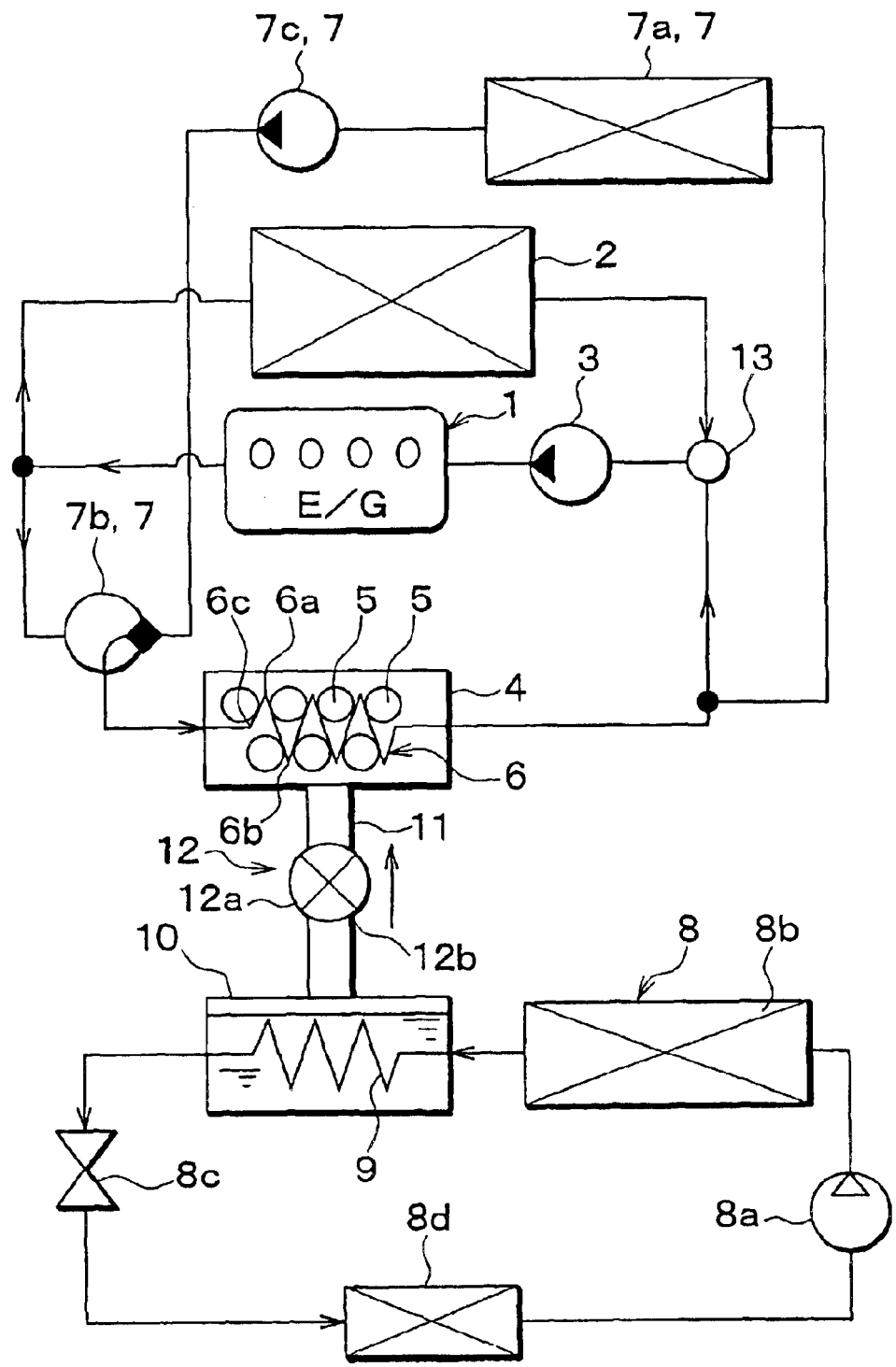
FIG. 4 is a schematic diagram showing the heat storage system in an auxiliary-cooling priority mode, according to the first embodiment.

The auxiliary-cooling priority mode, shown in FIG. 4, is performed when the temperature of cooling water from the engine 1 becomes equal to or higher than the predetermined temperature (e.g., 80–90° C.) under which the warm-up operation of the engine 1 can be determined to be ended. Specifically, cooling water is circulated between the heat storage radiator 7a and the adsorption core 6 while the valve 12 is opened. In this case, since the atmospheric temperature in the adsorption chamber 4 can be maintained at a temperature (e.g., 25° C.) corresponding to the outside air temperature, the liquid medium in the liquid-medium storage chamber 10 absorbs heat from refrigerant through the condensation core 9. Therefore, the liquid medium in the liquid-medium storage chamber 10 continues vaporization. Thus, the high-pressure refrigerant at an outlet of the condenser 8b is cooled by the liquid medium through the condensation core 9, so that the pressure of the high-pressure refrigerant can be continuously reduced as compared with a vapor compression refrigerator which does not include the condensation core 9.

As described above, the heat storage system according to the first embodiment can be effectively used by effectively using the heat absorption function, not only in the winter where an outside air temperature is low, but also in the summer where the outside air temperature is high and cooling operation is required. Furthermore, the heat storage system can be produced in low cost by adding a little change to a prior heat storage system. Further, the construction of the heat storage system according to the first embodiment can be effectively simplified, and the number of valves can be reduced.

Figure 5:
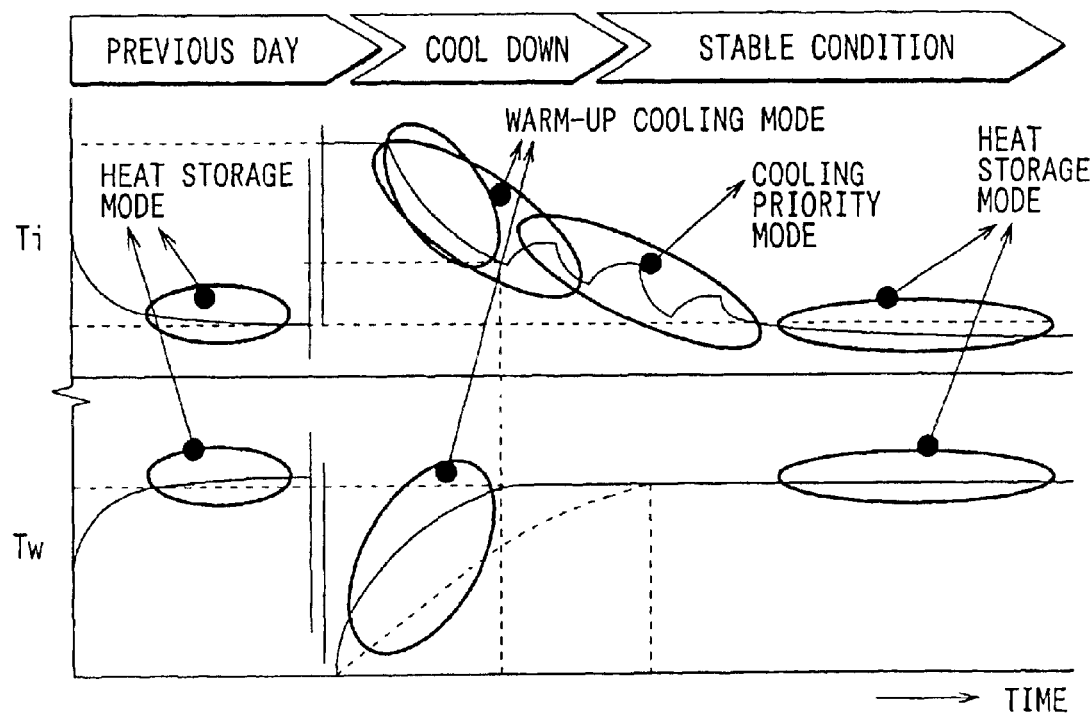
FIG. 5 is a graph showing a relationship between a traveling time of a vehicle, a temperature change (Tw) of cooling water from a vehicle engine and an average temperature (Ti) in a passenger compartment, and a relationship between the traveling time of the vehicle and an operational mode of the heat storage system according to the first embodiment.

Here, test results of the heat storage system for a vehicle according to the first embodiment is shown in FIG. 5. FIG. 5 plots an air temperature Ti in the passenger compartment and a cooling water temperature Tw of the engine 1 as the ordinates, and plots a vehicle traveling time Time as the abscissa. As shown in FIG. 5, an operation mode of the heat storage system, such as the heat storage mode, the warm-up/cooling mode, and the cooling priority mode can be effectively selected.

(Second Embodiment)

Figure 6:
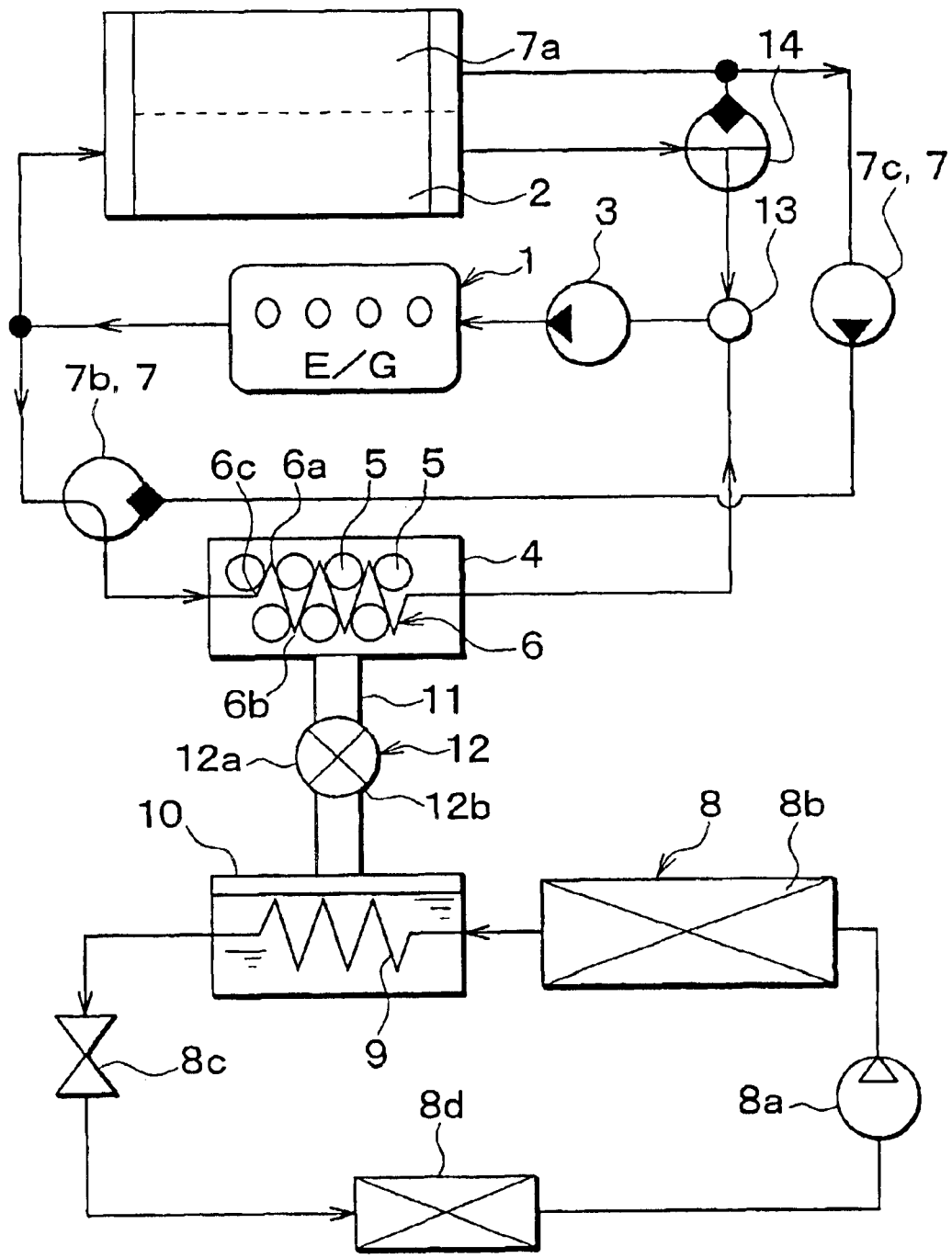
FIG. 6 is a schematic diagram showing a heat storage system according to a second embodiment of the present invention.
Figure 7:
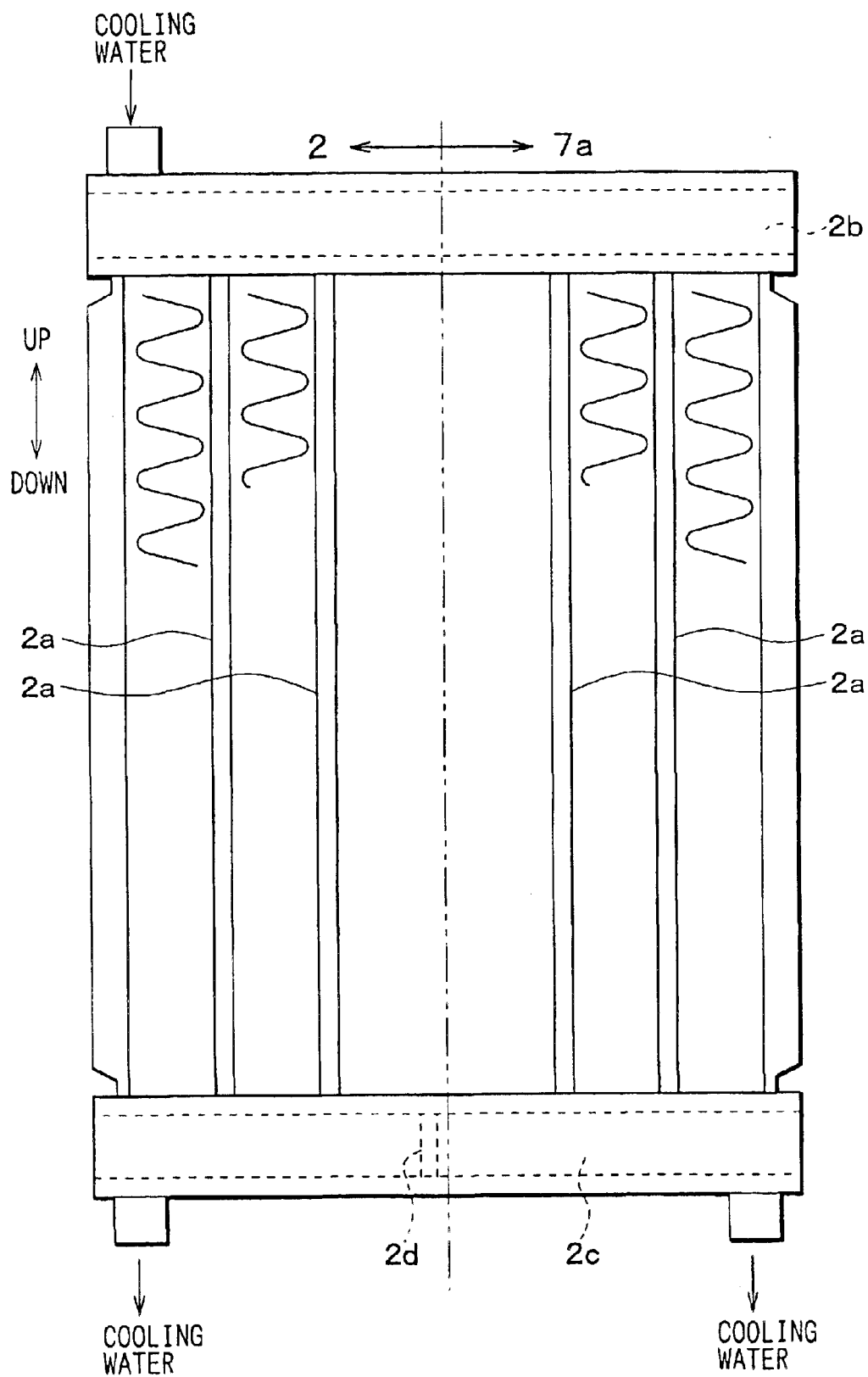
FIG. 7 is a schematic diagram showing a radiator used for the heat storage system according to the second embodiment.

In the second embodiment, as shown in FIG. 6, the radiator 2 and the heat storage radiator 7a are integrated with each other. Specifically, as shown in FIG. 7, the integrated radiator includes plural tubes 2a in which cooling water flows, header tanks 2b, 2c, and a separator 2d for partitioning a space in the header tank 2c at a water outlet side. The header tanks 2b, 2c communicate with tubes 2a at both ends of the tubes 2a in its longitudinal direction, respectively. As shown in FIG. 6, a three-way switching valve 14 switches any one of a cooling water stream from the radiator 2 and a cooling water stream from the heat storage radiator 7a.

In the second embodiment, the other parts are similar to those of the above-described first embodiment. Therefore, in the second embodiment, one of the heat storage mode, the warm-up/auxiliary-cooling mode and the auxiliary-cooling priority mode can be selected similar to the above-described first embodiment.

(Third Embodiment)

Figure 8:
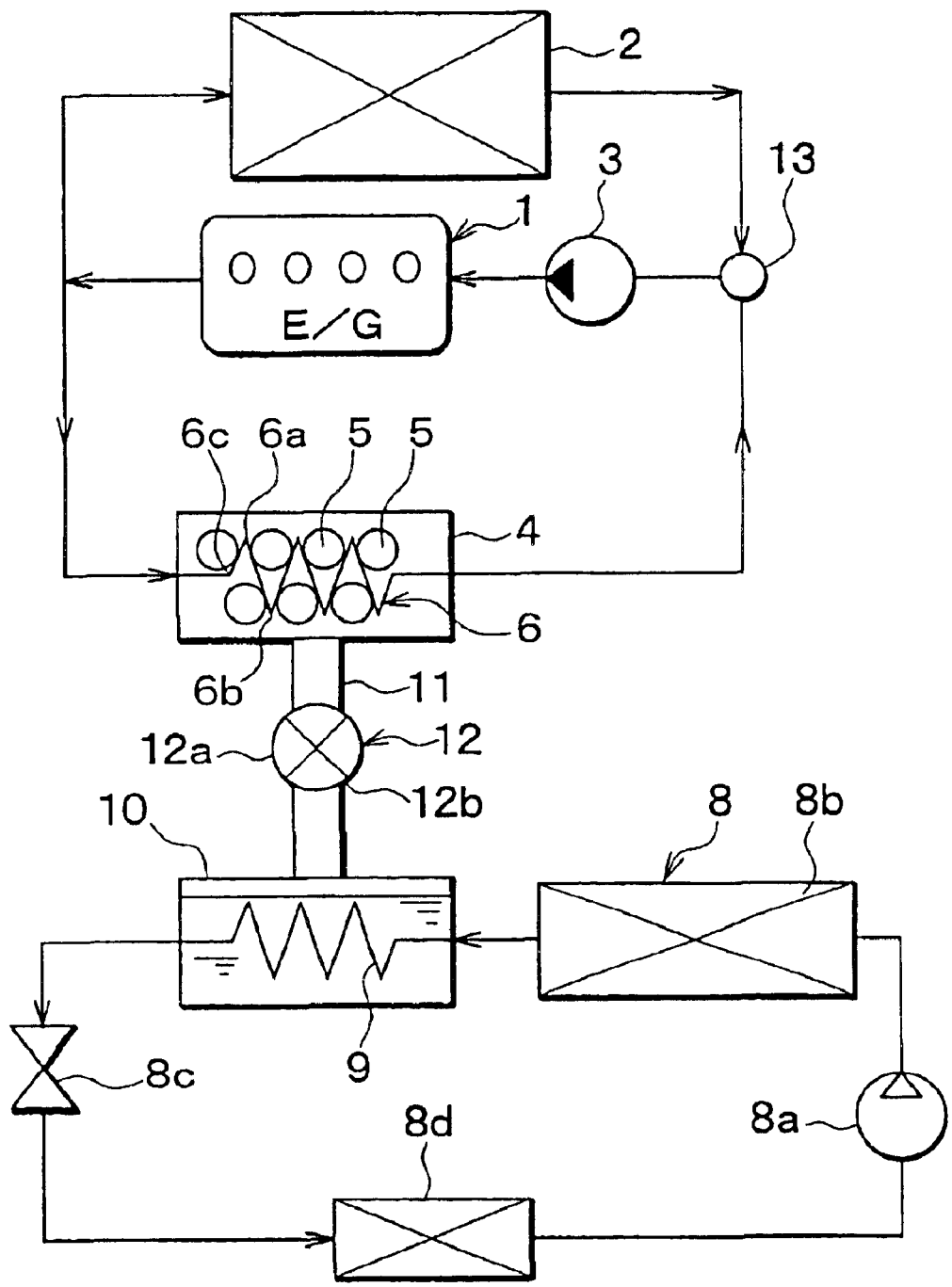
FIG. 8 is a schematic diagram showing a heat storage system according to a third embodiment of the present invention.

In the third embodiment shown in FIG. 8, the apparatuses constructing the adsorbent cooling unit 7 such as the heat storage radiator 7a described in the first embodiment, are eliminated, thereby simplifying the construction of the heat storage system.

Even in the third embodiment, the other parts are similar to those of the above-described first embodiment. Therefore, in the third embodiment, one of the heat storage mode, the warm-up/auxiliary-cooling mode and the auxiliary-cooling priority mode can be selected similar to the above-described first embodiment.

(Fourth Embodiment)

Figure 9:
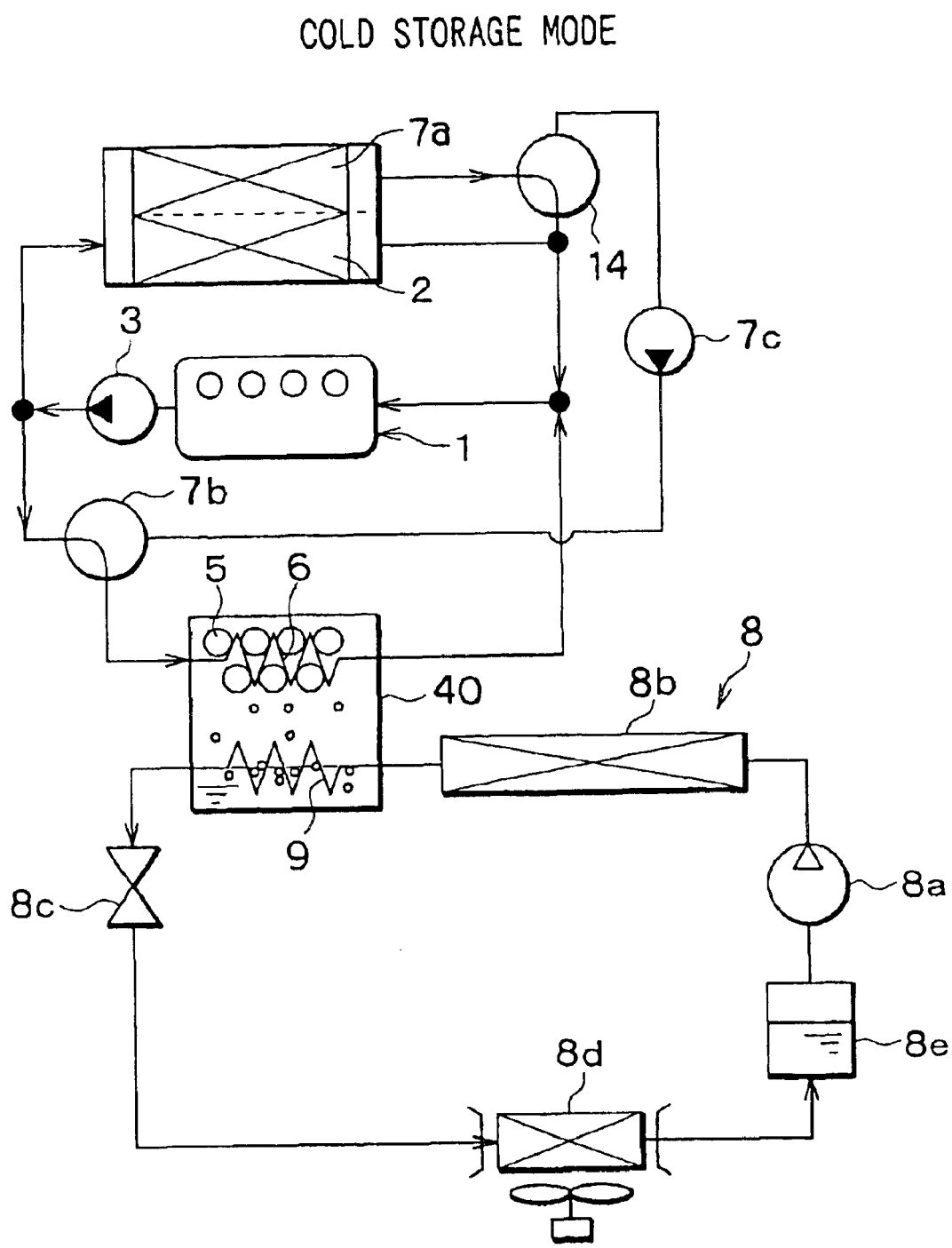
FIG. 9 is a schematic diagram showing a heat storage system (cold storage system) in a cold storage mode, according to a fourth embodiment of the present invention.
Figure 10:
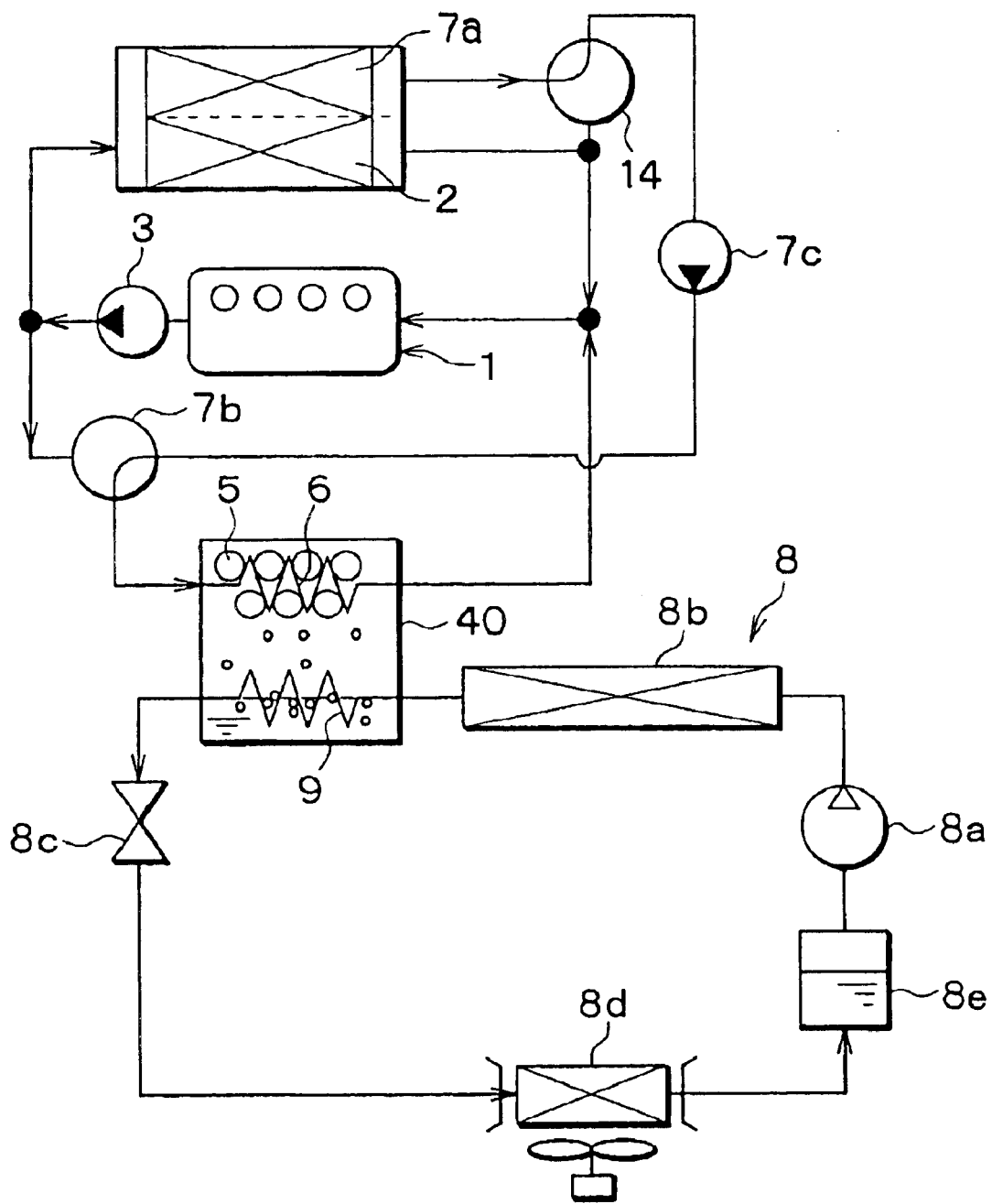
FIG. 10 is a schematic diagram showing the heat storage system in a cold release mode, according to the fourth embodiment.
Figure 11:
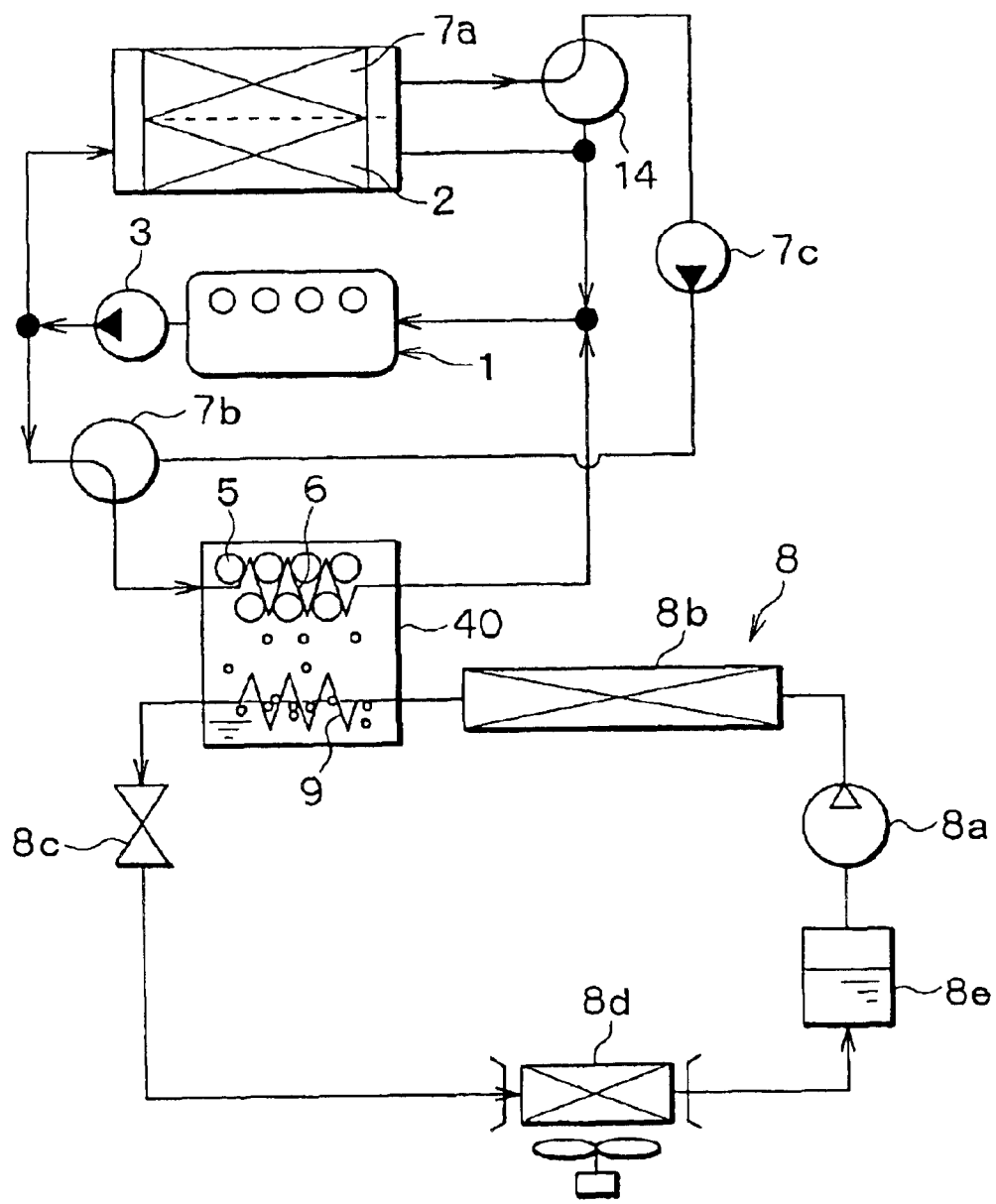
FIG. 11 is a schematic diagram showing the heat storage system in a cold pre-release mode, according to the fourth embodiment.

In the above embodiments, the adsorption chamber 4 and the liquid-medium storage chamber 10 are disposed to be separated from each other, and the communication passage 11 and the valve 12 are provided therebetween. However, in a heat storage system (cold storage system) according to the fourth embodiment, as shown in FIGS. 9–11, the adsorption chamber 4 and the liquid-medium storage chamber 10 are integrated with each other to form a storage chamber 40, and the communication passage 11 and the valve 12 described in the first embodiment are eliminated. Here, the medium (water) is accommodated and sealed in the storage chamber 40 at pressure much lower than atmospheric pressure. Further, the adsorption core 6 is disposed in an adsorption space (corresponding to the adsorption chamber 4 shown in FIG. 1) of the storage chamber 40, and the condensation core 9 is disposed in a liquid-medium storage space (corresponding to the liquid-medium storage chamber 10 shown in FIG. 1) of the storage chamber 40. The liquid medium is stored in the liquid-medium storage space of the storage chamber 40. Furthermore, in the fourth embodiment, the heat storage radiator 7a and the radiator 2 are integrated with each other as in the second embodiment.

Next, operation of the heat storage system according to the fourth embodiment will be described. In the fourth embodiment, the operation mode of the heat storage system is defined relative to the refrigerator 8 (e.g., vapor compression refrigerant cycle). A cold storage mode (heat storage mode), shown in FIG. 9, is performed when the rotational speed of the engine 1 is higher than an idling rotational speed thereof. That is, the cold storage mode is performed when a temperature of cooling water from the engine 1 becomes equal to or higher than a predetermined temperature (e.g., 80–90° C.) under which warm-up operation of the engine 1 can be determined to be ended. Specifically, high-temperature cooling water from the engine 1 is circulated into the adsorption core 6 while the engine 1 and the vapor compression refrigerator 8 are operated. Then, the adsorbents 5 absorb waste heat from the engine 1, and the adsorbed medium is desorbed from the adsorbents 5 as gas medium.

At this time, the atmospheric temperature in the adsorption space of the storage chamber 40 is in a temperature range (e.g., 80–90° C.) corresponding to the cooling water temperature, and the atmospheric temperature in the liquid-medium storage space of the storage chamber 40 is in a temperature range (e.g., 40–60° C.) corresponding to the refrigerant temperature from the condenser 8b. The atmospheric temperature in the liquid-medium storage space of the storage chamber is lower than the atmospheric temperature in the adsorption space of the storage chamber 40. Therefore, the medium desorbed from the adsorbents 5 flows toward the liquid-medium storage space, and is cooled and condensed by the condensation core 9. Then, the condensed medium is stored as liquid medium in the liquid-medium storage space in the storage chamber 40. Heat, supplied to refrigerant by the condensation core 9, is finally radiated to atmospheric air through the condenser 8b.

While high-temperature cooling water flows in the adsorption core 6, the medium desorption from the adsorbents 5 is continued. At this time, since the medium is not adsorbed on the adsorbents 5, the desorbed medium is liquefied by the condensation core 9, so that cold storage operation is continued as storage operation of the liquid medium.

A cold release mode (auxiliary-cooling mode), shown in FIG. 10, is performed when the vehicle is stopped after the cold storage operation is ended. Specifically, in the cold release mode, low-temperature cooling water, cooled by the heat storage radiator 7a, is circulated into the adsorption core 6. Therefore, the adsorbents 5 are cooled, and relative humidity around the adsorbents 5 increases, so that gas medium (moisture) around the adsorbents 5 is adsorbed on the adsorbents 5. Thus, the pressure in the adsorption space of the storage chamber 40 reduces relative to pressure in the liquid-medium storage space of the storage chamber 40. In this condition, when the vapor compression refrigerator 8 is operated, the atmospheric temperature in the liquid-medium storage space becomes a temperature (e.g., 40–60° C.) corresponding to the refrigerant temperature from the condenser 8b, and the atmospheric temperature in the adsorption space becomes a temperature (e.g., 25° C.) corresponding to an outside air temperature. Thus, the liquid medium in the liquid-medium storage space absorbs heat from the refrigerant through the condensation core 9, and continues vaporization.

Accordingly, high-pressure refrigerant in the condenser 8b is cooled by using this vaporization in the liquid-medium storage space of the storage chamber 40. Therefore, the high-pressure refrigerant from the condenser 8b can be cooled as compared with a vapor compression refrigerator which does not include the condensation core 9, and enthalpy (dryness) of refrigerant at the inlet of the evaporator 8d can be reduced, thereby improving cooling performance of the vapor compression refrigerator 8. Thus, the pressure of refrigerant discharged from the compressor 8a reduces. As a result, motive power consumed by the compressor 8a, that is, the load of the engine 1 is reduced, and motive power consumed by the vapor compression refrigerator 8 can be effectively reduced.

A cold pre-release mode, shown in FIG. 11, is performed when the load (waste heat) of the engine 1 is relatively low and cooling water from the engine 1 can be sufficiently cooled by only the radiator 2 after the cold storage operation is ended. Specifically, before the cold release mode is selected after the cold storage operation is completed, only the switching valve 14 described in the second embodiment is operated as in the cold release mode. Then, cooling water, cooled to near the outside air temperature, is introduced into the adsorption core 6. Accordingly, when the cold release mode is selected, the adsorbents 5 can be effectively cooled by using low-temperature cooling water, so that the adsorbents 5 can be rapidly cooled, and relative humidity around the adsorbents 5 can be rapidly increased. Therefore, auxiliary cooling performance can be increased.

Further, in the fourth embodiment, as shown in FIGS. 9–11, the vapor compression refrigerator 8 is an accumulator cycle where a gas-liquid separator 8e is disposed at a low refrigerant pressure side (a suction side of the compressor 8a). Accordingly, in the vapor compression refrigerator, refrigerant from the evaporator 8d flows into the gas-liquid separator 8e to be separated into gas refrigerant and liquid refrigerant in the gas-liquid separator. Gas refrigerant separated in the gas-liquid separator 8e is supplied to the compressor 8a, and liquid refrigerant is stored in the gas-liquid separator 8e as surplus refrigerant in the vapor compression refrigerator 8. In the heat storage system of the fourth embodiment, the other parts are similar to those of the first embodiment.

(Fifth Embodiment)

Figure 12:
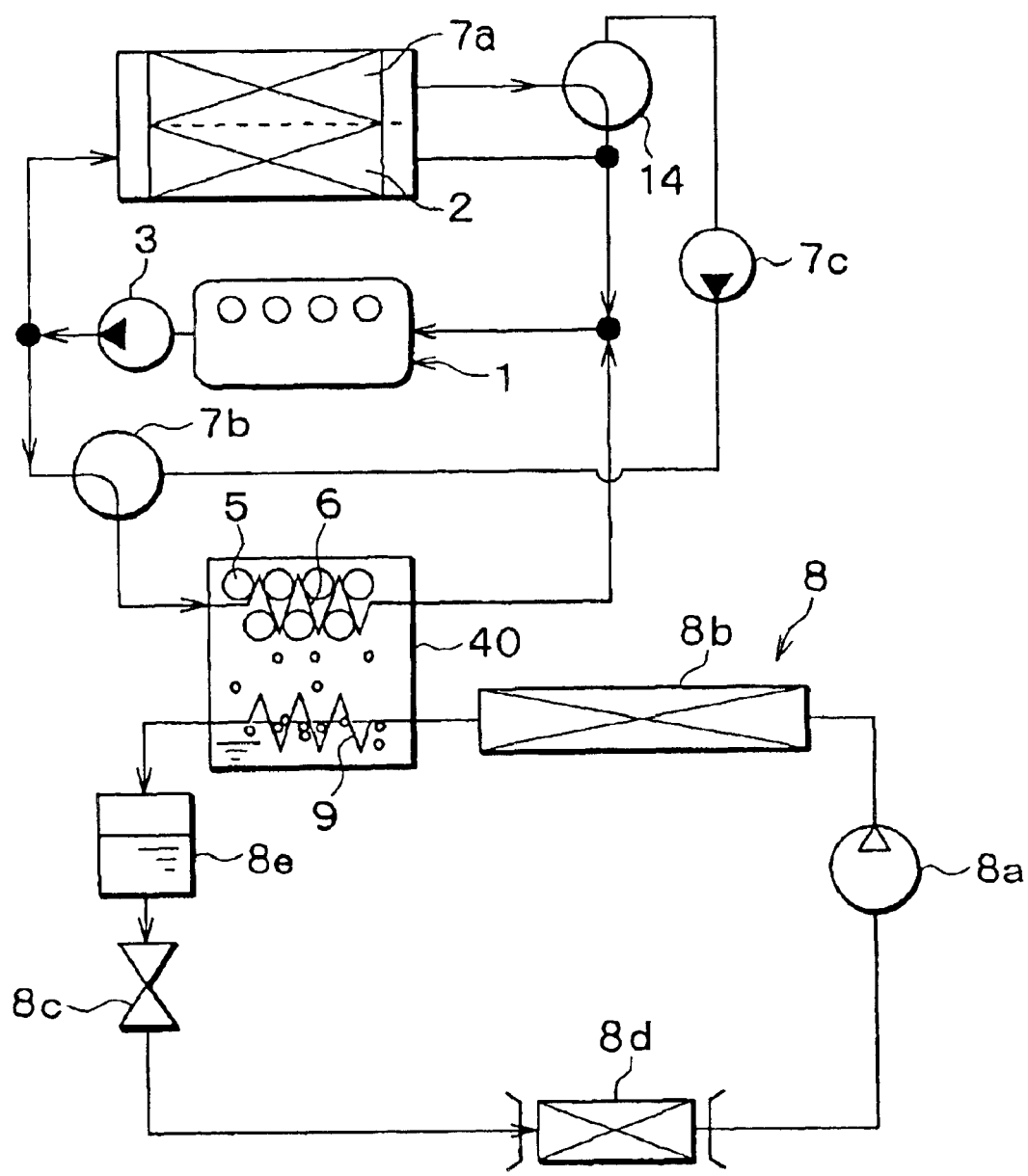
FIG. 12 is a schematic diagram showing a heat storage system according to a fifth embodiment of the present invention.

In the fifth embodiment, as shown in FIG. 12, the vapor compression refrigerator 8 is a receiver cycle where the gas-liquid separator 8e is disposed at a high refrigerant pressure side. Here, the condensation core 9 is disposed in a refrigerant passage between the receiver (gas-liquid separator) 8e and the condenser 8b.

In the fifth embodiment, the other parts are similar to those of the above-described fourth embodiment. Accordingly, in the fifth embodiment, any one operation mode such as the cold storage mode (heat storage mode), the cold release mode and the cold pre-release mode described in the fourth embodiment can be selected.

(Sixth Embodiment)

Figure 13:
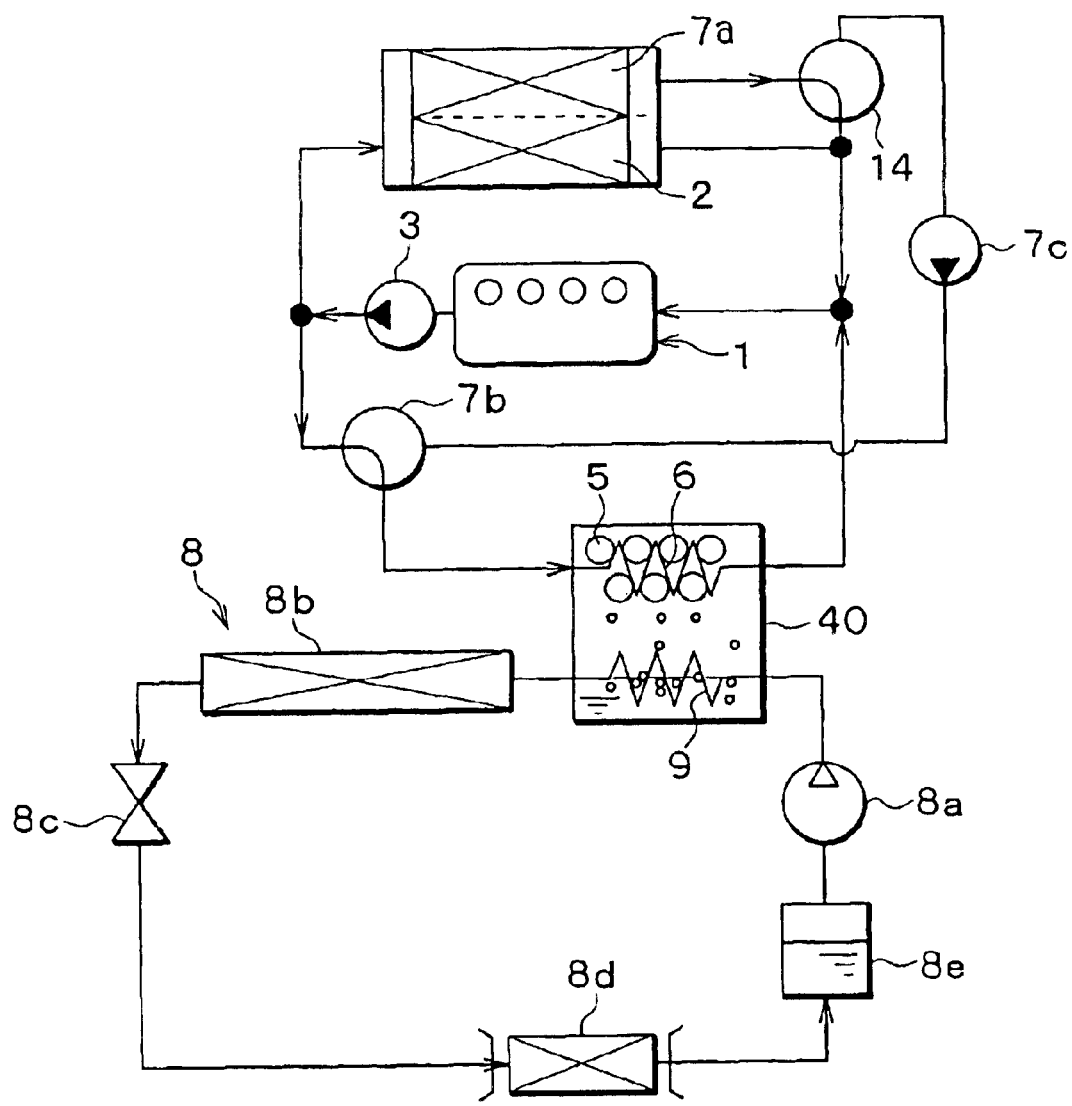
FIG. 13 is a schematic diagram showing a heat storage system according to a sixth embodiment of the present invention.
Figure 14:
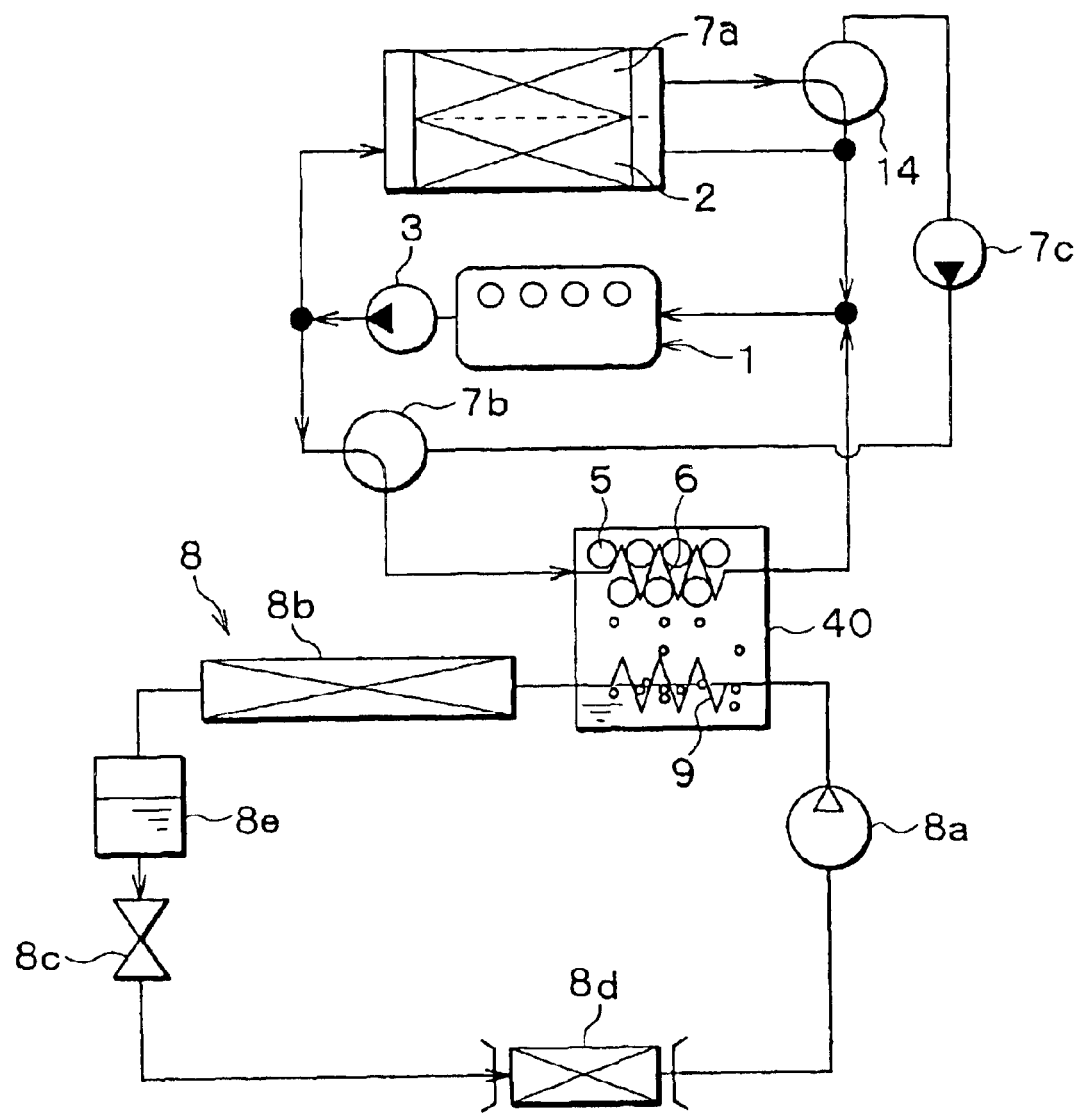
FIG. 14 is a schematic diagram showing a heat storage system according to a modification of the sixth embodiment.

In the sixth embodiment, as shown in FIG. 13, the condensation core 9 is disposed in a refrigerant passage between a discharge port of the compressor 8a and a refrigerant inlet of the condenser 8b. In the heat storage system shown in FIG. 13, the other parts are similar to those of the above-described fourth embodiment, and one operation mode described in the fourth embodiment can be selected. Similarly, in FIG. 14, the condensation core 9 is disposed in a refrigerant passage between the discharge port of the compressor 8a and the refrigerant inlet of the condenser 8b in the heat storage system of the fifth embodiment. Accordingly, in the heat storage system shown in FIG. 14, the other parts are similar to those of the above-described fifth embodiment, and one operation mode described in the fifth embodiment can be selected.

(Seventh Embodiment)

The seventh embodiment of the present invention will be now described with reference to FIGS. 15 and 16. In the above-described fourth through sixth embodiments, the temperature of cooling water flowing into the adsorption core 6 is controlled by the two switching valves 7b, 14 and the pump 7c. However, in the seventh embodiment, as shown in FIGS. 15, 16, the temperature of cooling water flowing into the adsorption core 6 is controlled by a single switching valve 7d and the pump 7c.

Figure 15:
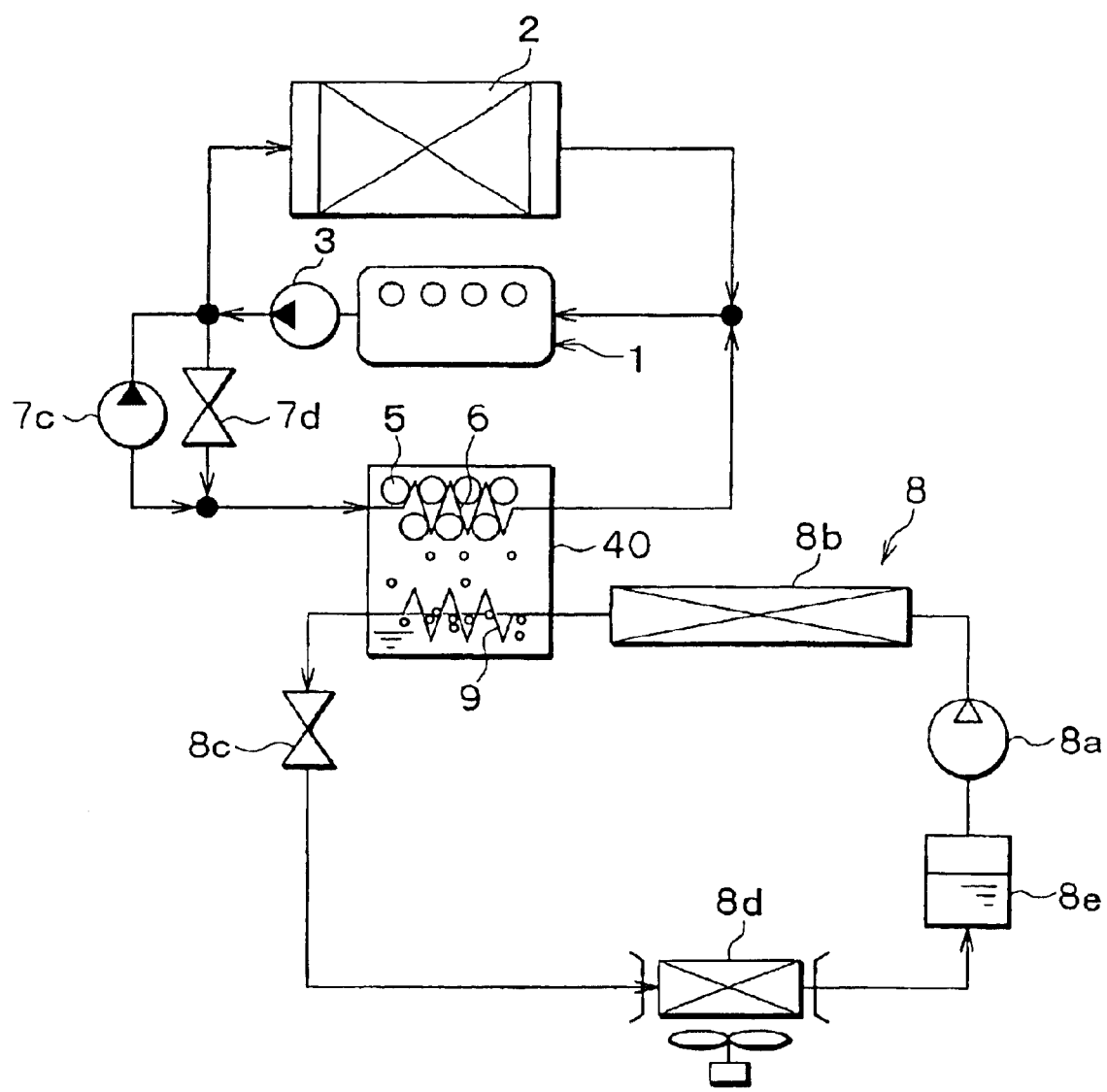
FIG. 15 is a schematic diagram showing a heat storage system in the cold storage mode, according to a seventh embodiment of the present invention.
Figure 16:
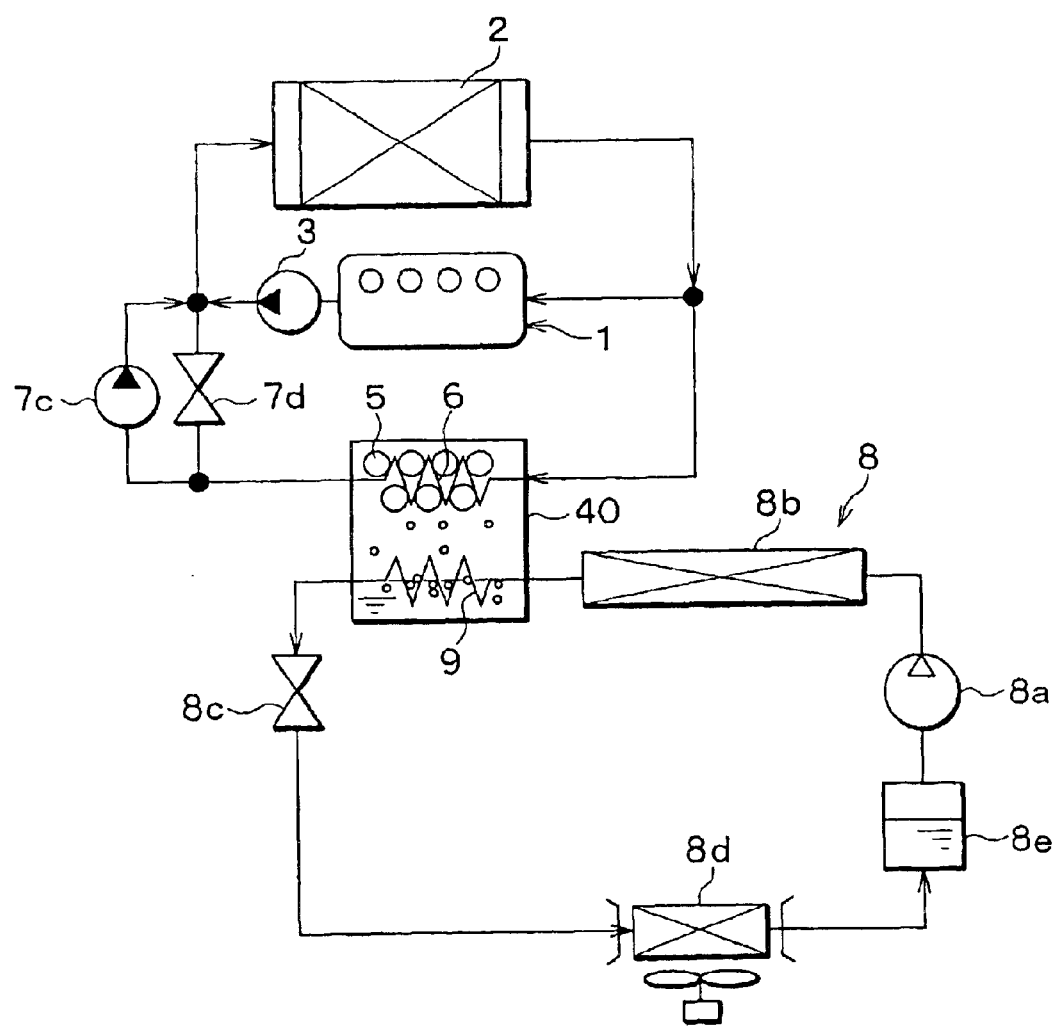
FIG. 16 is a schematic diagram showing the heat storage system in the cold release mode, according to the seventh embodiment.

Specifically, as shown in FIG. 15, the switching valve 7d is opened while the operation of the pump 7c is stopped in the cold storage mode. Therefore, high-temperature cooling water, flowing out from the engine 1, is circulated between the engine 1 and the adsorption core 6, and the medium adsorbed on the adsorbents 5 is desorbed therefrom, so that the cold storage operation is performed. In the cold release mode (auxiliary-cooling operation), as shown in FIG. 16, the switching valve 7d is closed and the pump 7c is operated. Therefore, low-temperature cooling water, flowing out from the radiator 2, is circulated between the radiator 2 and the adsorption core 6, so that high-pressure refrigerant is cooled in the vapor compression refrigerator 8. In FIGS. 15, 16, the other parts are similar to those of the above-described fourth embodiment. In the seventh embodiment, the structure using the single switching valve 7d can be used for the fifth and sixth embodiments.

(Eighth Embodiment)

In the above-described fourth to seventh embodiments, any one of the cold storage mode and the cold release mode is switched by controlling the temperature of cooling water to be circulated into the adsorption core 6. However, in the eighth embodiment, the temperature of the adsorbents 5 is generally stabilized at least after the end of the warm-up operation of the engine 1. Thus, any one of the cold storage mode and the cold release mode can be automatically switched in accordance with a thermal load of the vapor compression refrigerator 8.

Figure 17:
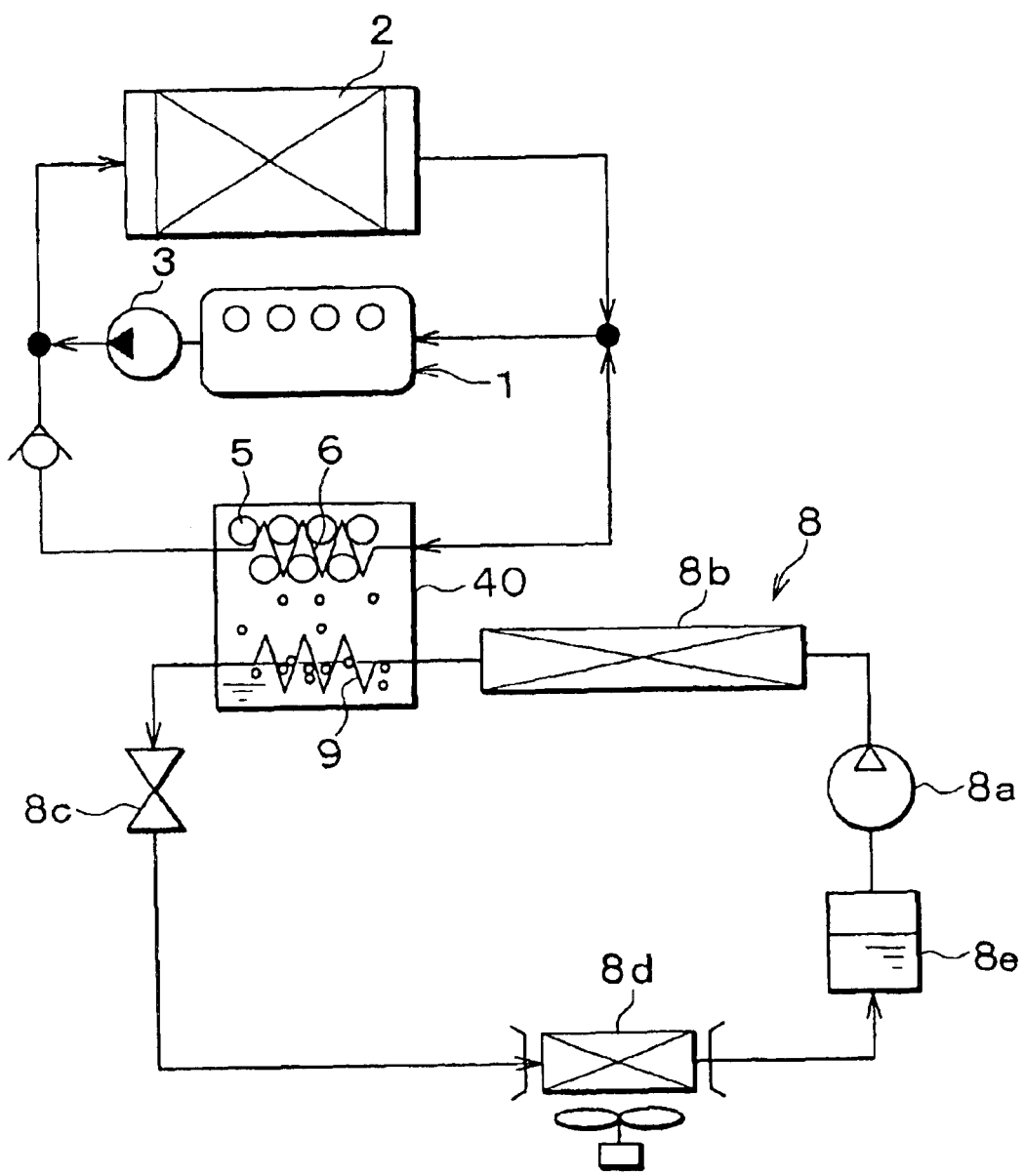
FIG. 17 is a schematic diagram showing a heat storage system according to an eighth embodiment of the present invention.

Specifically, as shown in FIG. 17, the heat storage system is constructed so that cooling water from the engine 1 is always circulated into the adsorption core 6. When the rotational speed of the compressor 8a is high in traveling of the vehicle, a sufficient amount of refrigerant can be circulated in the vapor compression refrigerator 8. In this case, when a sufficient amount of cooling air is supplied to the condenser 8b, the temperature of high-pressure refrigerant at a refrigerant outlet of the condenser 8b is low, and the gas medium desorbed from the adsorbents 5 is cooled and liquefied by the condensation core 9 as in the fourth embodiment. That is, at this time, the cold storage mode described in the fourth embodiment is selected.

On the other hand, when the rotational speed of the compressor 8a is low in stoppage of the vehicle, a sufficient amount of refrigerant cannot be circulated in the vapor compression refrigerator 8. In this case, when a sufficient amount of cooling air cannot be supplied to the condenser 8b, the temperature of the high-pressure refrigerant increases, the liquid medium stored in the liquid-medium storage space of the storage chamber 40 in the cold storage mode is evaporated. Then, relative humidity in the adsorption space of the storage chamber 40 increases, and the evaporated medium is adsorbed on the adsorbents 5. That is, at this time, the cold release mode described in the fourth embodiment is selected. Thus, any one of the cold storage mode and the cold release mode is automatically switched in accordance with the thermal load of the vapor compression refrigerator 8.

Figure 18:
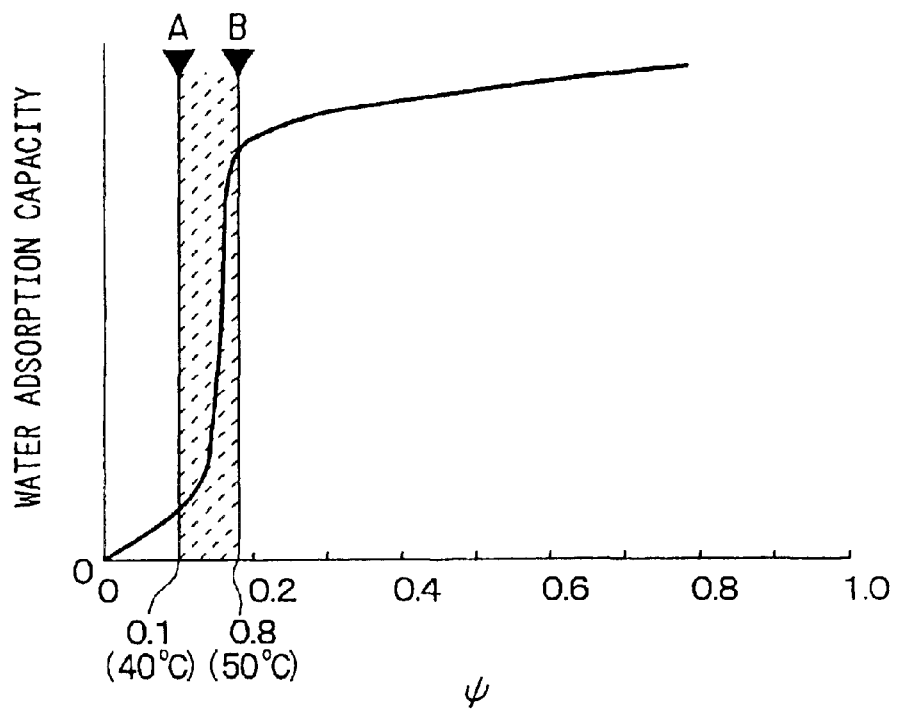
FIG. 18 is a graph showing characteristics of an adsorbent used for the heat storage system according to the eighth embodiment.

The adsorbent, most suitable to the heat storage system (e.g., a vehicle air conditioner) according to the eighth embodiment, has the following water adsorption capacity. As shown in FIG. 18, the water adsorption capacity of the adsorbents 5 is largely changed between a small thermal load of the vapor compression refrigerator 8 and, a large thermal load thereof. Specifically, in FIG. 18, a point A indicates a water adsorption capacity at relative humidity $\Psi$ of 0.1% corresponding to a refrigerant temperature of 40° C., and a point B indicates a water adsorption capacity at relative humidity $\Psi$ of 0.18% corresponding to a refrigerant temperature of 50° C. In FIG. 18, the cold storage mode is selected in relative humidity $\Psi$ lower than the point A, and the cold release mode is selected in relative humidity $\Psi$ higher than the point B. In FIG. 17, the structure of the eighth embodiment is typically used for the fourth embodiment. Accordingly, the other parts of the eighth embodiment are similar to those of the above-described fourth embodiment. The structure of the eighth embodiment can be used for the fifth to seventh embodiments. Even in this case, any one of the cold storage mode and the cold release mode can be automatically switched in accordance with the thermal load of the vapor compression refrigerator 8.

(Ninth Embodiment)

Figure 20:
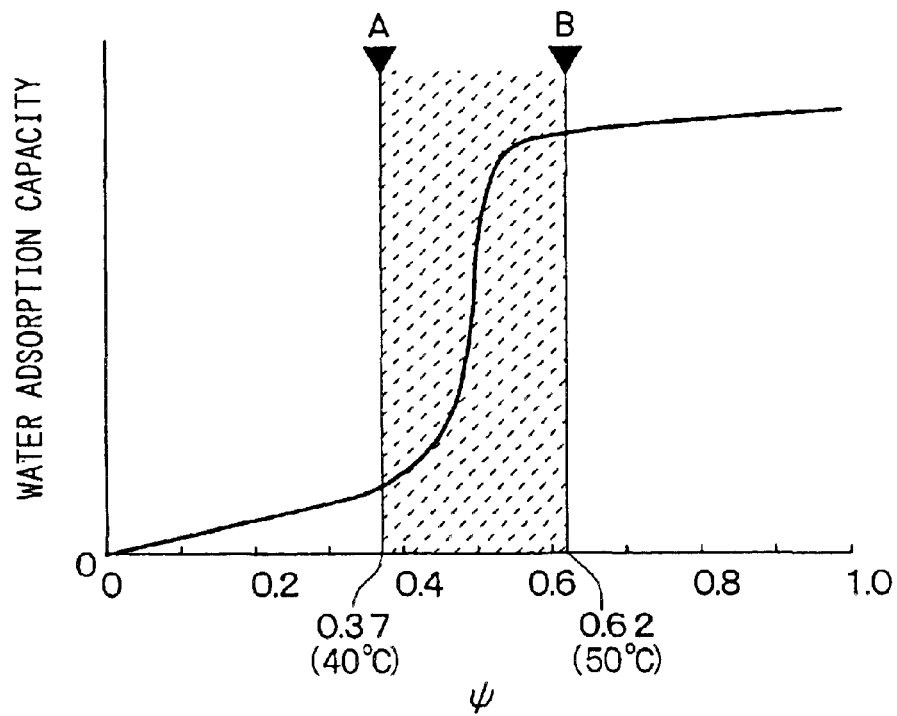
FIG. 20 is a graph showing characteristics of an adsorbent used for the heat storage system according to the ninth embodiment.
Figure 19:
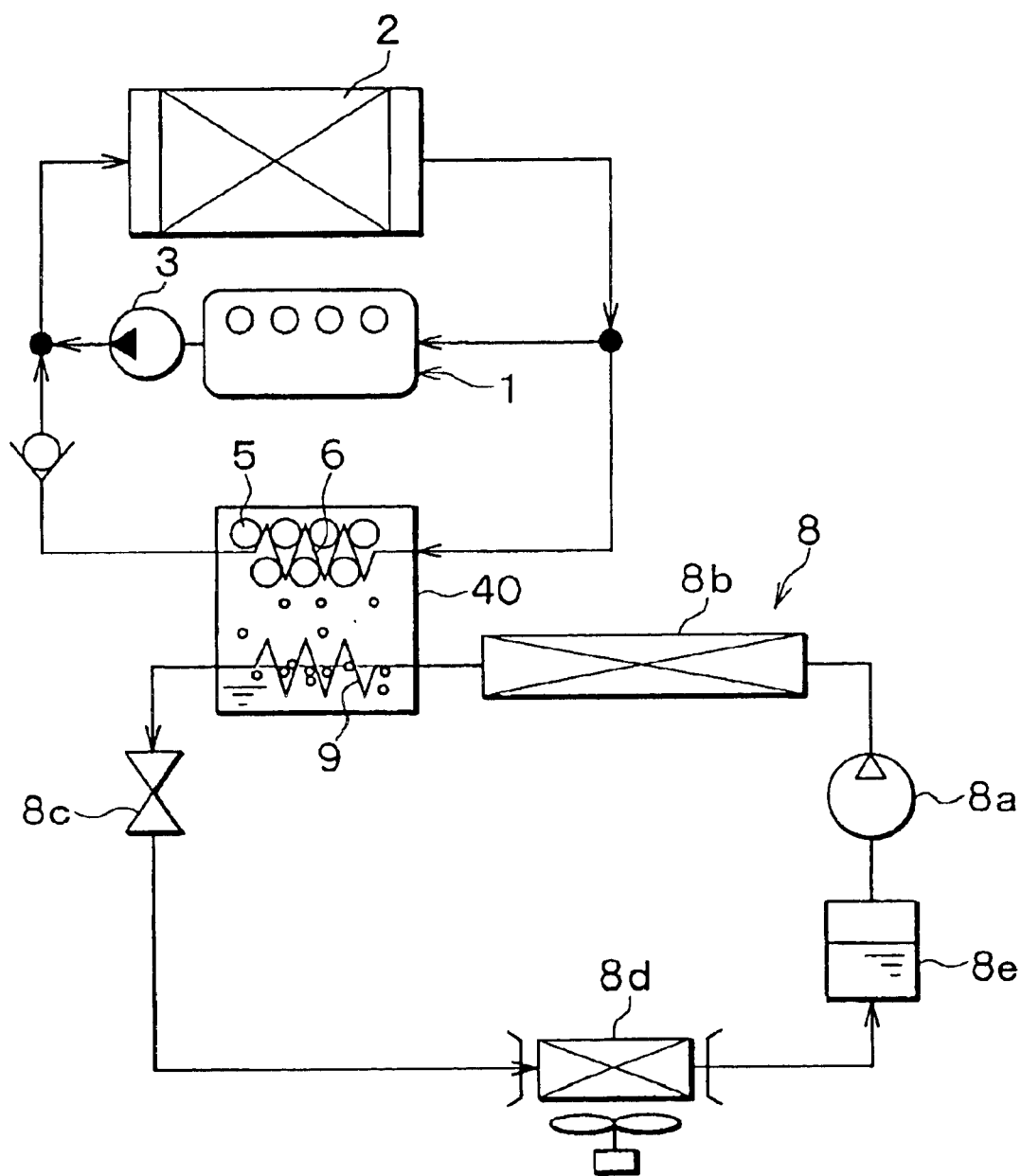
FIG. 19 is a schematic diagram showing a heat storage system according to a ninth embodiment of the present invention.

In the above-described eighth embodiment, cooling water, flowing out from the engine 1, is always circulated into the adsorption core 6, thereby generally stabilizing the temperature of the adsorbents 5. However, in the ninth embodiment, as shown in FIG. 19, cooling water flowing out from the radiator 2 is always circulated into the adsorption core 6, thereby generally stabilizing the temperature of the adsorbents 5. Although operation in the ninth embodiment is similar to the operation in the eighth embodiment, the temperature of cooling water circulating in the adsorption core 6 in the ninth embodiment is lower than that in the eighth embodiment. Therefore, the relative humidity $\Psi$, at which the medium is adsorbed to or desorbed from the adsorbent 5, is different between the eighth and ninth embodiments. FIG. 20 is a graph showing a characteristic of the adsorbent 5, most suitable to the ninth embodiment.

(Tenth Embodiment)

Figure 22:
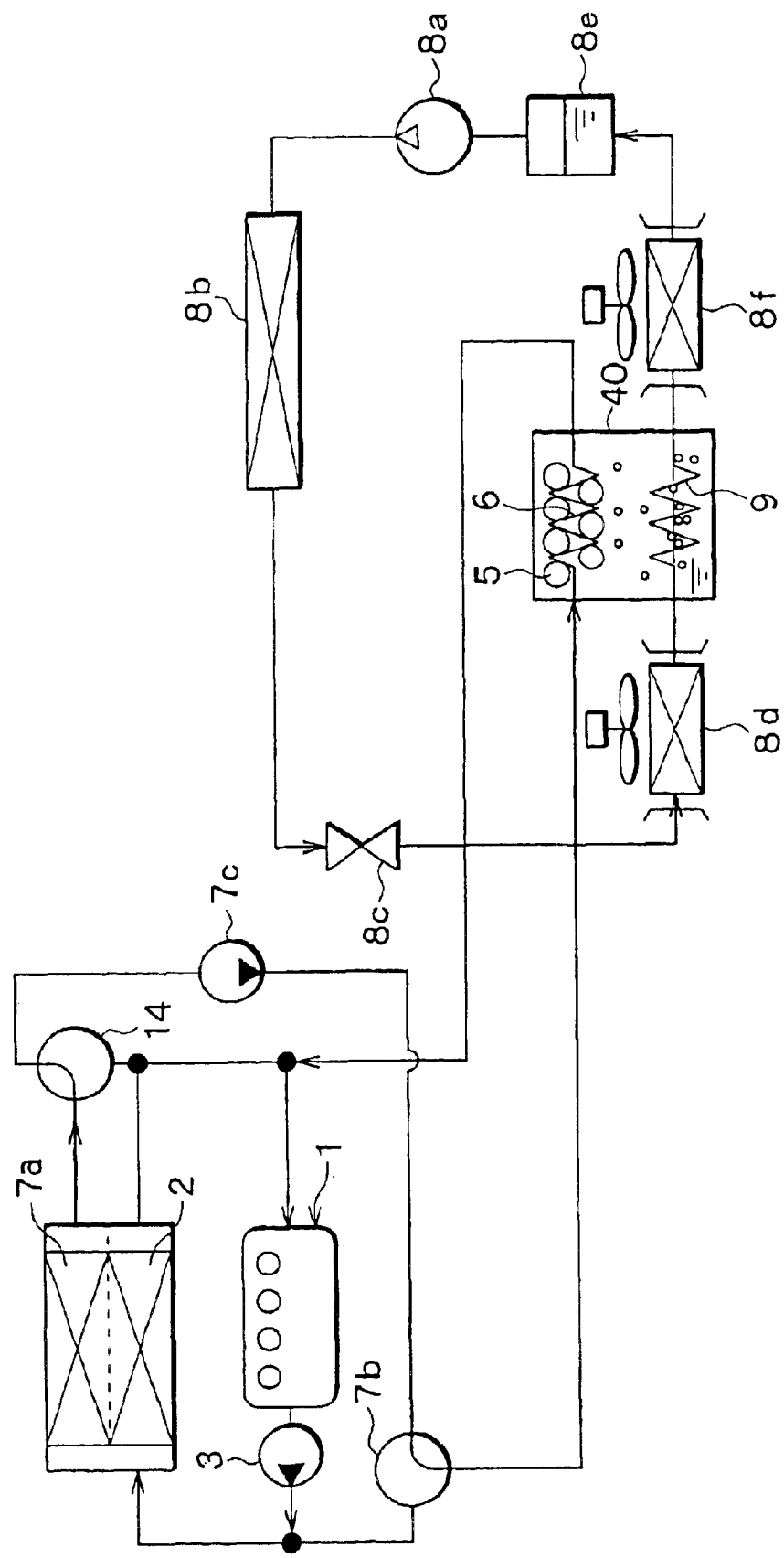
FIG. 22 is a schematic diagram showing the heat storage system in the cold release mode, according to the tenth embodiment.

In the above-described embodiments, the high-pressure refrigerant in the refrigerator 8 is cooled by using the adsorbent cooling unit. However, in the tenth embodiment, the low-pressure refrigerant after being decompressed in the refrigerator 8 is cooled by using the adsorbent cooling unit. Specifically, as shown in FIGS. 21, 22, the condensation core 9 cools refrigerant flowing in a refrigerant passage connecting two upstream and downstream evaporators 8d, 8f. When the cold storage mode is selected as shown in FIG. 21, the gas medium desorbed from the adsorbents 5 is cooled and condensed by performing heat exchange with refrigerant flowing from the upstream evaporator 8d. The refrigerant flowing in the upstream evaporator 8d is heat exchanged with air to be blown into the passenger compartment to cool the air. The refrigerant, to flow into the downstream evaporator 8f, is heated by the condensation core 9. However, in the cold storage mode, cooling feeling is not largely reduced because the vapor compression refrigerator 8 has a sufficient cooling capacity.

When the cold release mode is selected as shown in FIG. 22, gas refrigerant, flowing out from the upstream evaporator 8d, is cooled and liquefied by the condensation core 9, and thereafter flows into the downstream evaporator 7f to be again evaporated. Accordingly, cooling performance of the vapor compression refrigerator 8 of the heat storage system used for a vehicle air conditioner can be increased without increasing the rotational speed of the engine 1, thereby reducing fuel consumption of the vehicle. In FIGS. 21, 22, preferably, the downstream evaporator 8f, positioned downstream from the upstream evaporator 8d in a refrigerant flowing direction, is disposed at an upstream air side of the evaporator 8d in an air flowing direction.

(Eleventh Embodiment)

Figure 23:
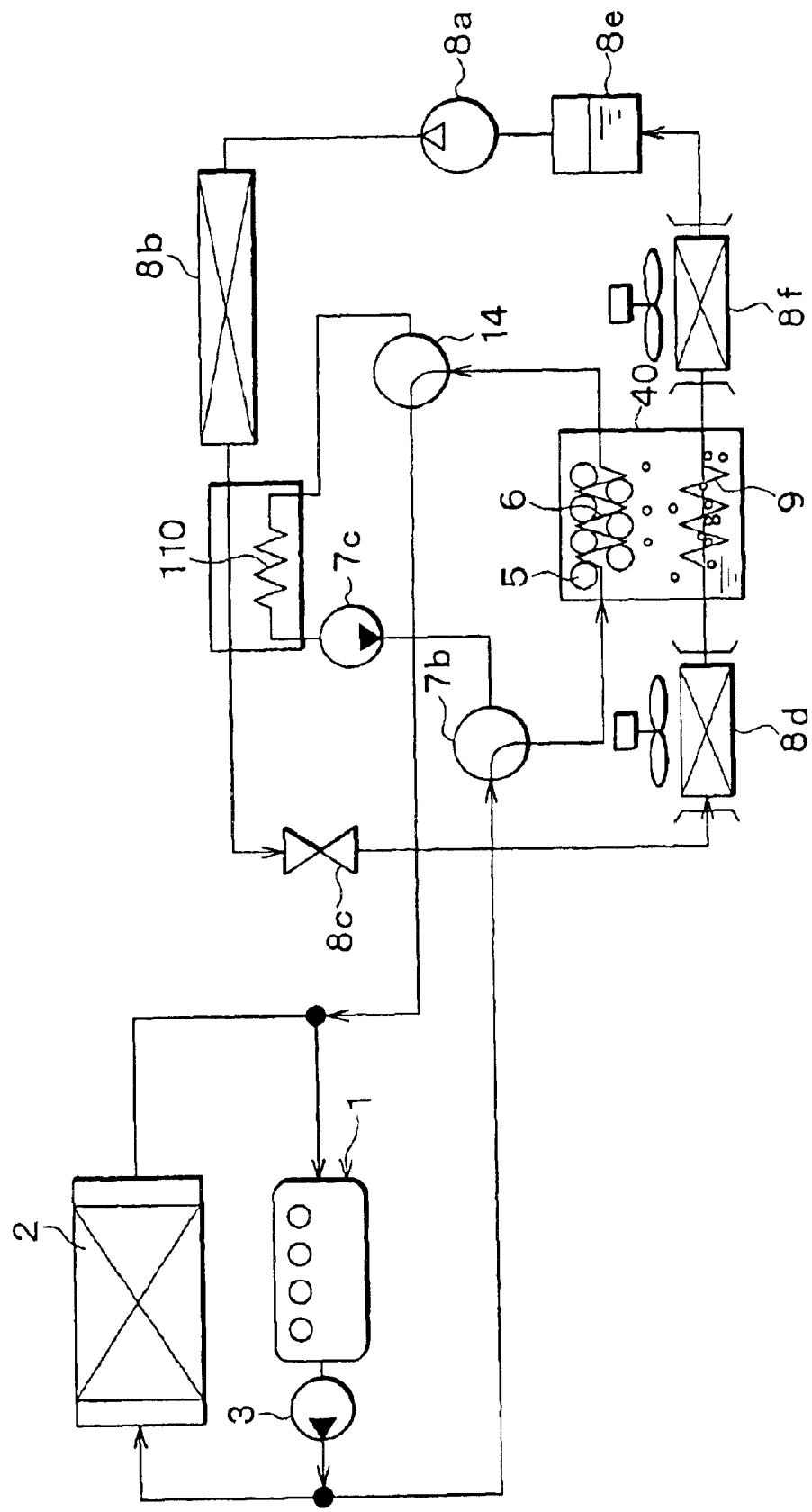
FIG. 23 is a schematic diagram showing a heat storage system in the cold storage mode, according to an eleventh embodiment of the present invention.
Figure 24:
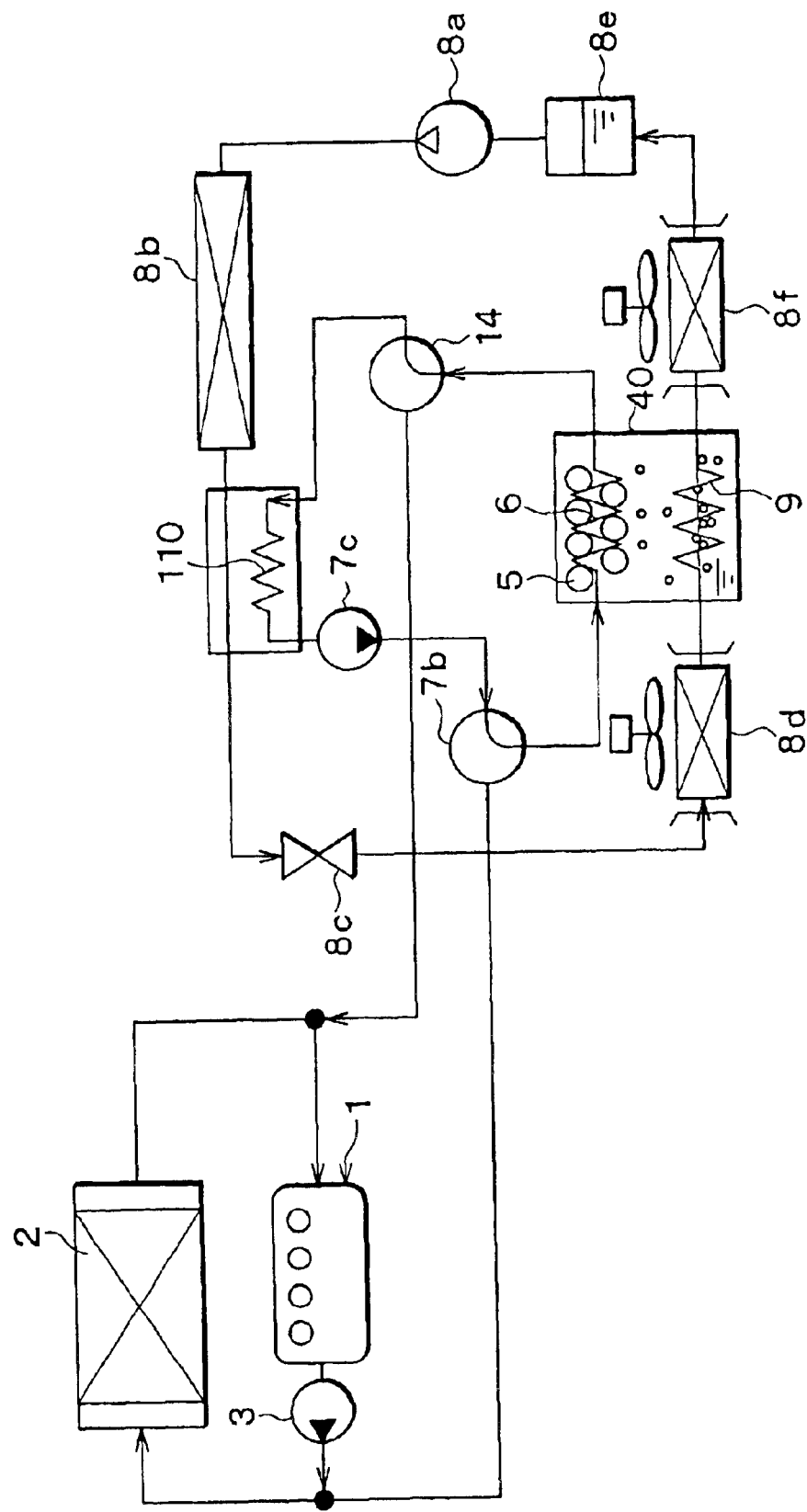
FIG. 24 is a schematic diagram showing the heat storage system in the cold release mode, according to the eleventh embodiment.

In the above-described tenth embodiment, cooling water flowing in the adsorption core 6 is cooled by the heat storage radiator 7a. In the eleventh embodiment, as shown in FIGS. 23, 24, the heat storage radiator 7a is eliminated, and a heat exchanger 110 is provided. The heat exchanger 110 performs heat exchange between cooling water flowing in the adsorption core 6 and high-pressure refrigerant at an outlet of the condenser 8b in the vapor compression refrigerator 8. Therefore, the cooling water flowing in the adsorption core 6 is cooled by the refrigerant flowing from the condenser 8b in the heat exchanger 110. The cold storage mode and the cold release mode are performed similarly to the above-described tenth embodiment. The cold storage mode is set as in FIG. 23, and the cold release mode is set in FIG. 24. In the eleventh embodiment, heat generated from the adsorbents 5 is radiated in the condenser 8b to outside air through refrigerant.

(Twelfth Embodiment)

Figure 25A:
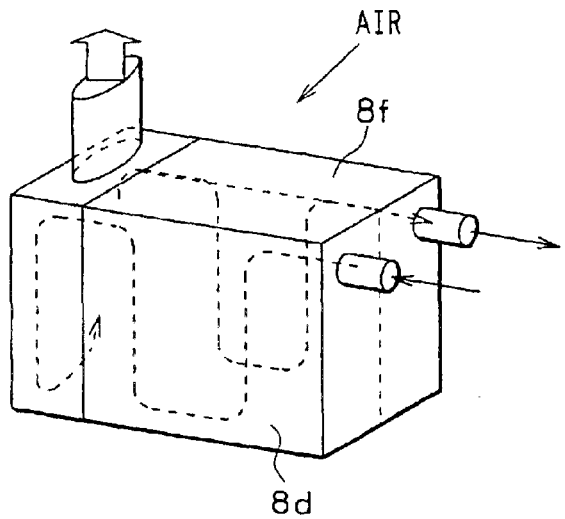
FIG. 25A is a perspective diagram showing an evaporator used for a heat storage system according to a twelfth embodiment of the present invention.
Figure 25B:
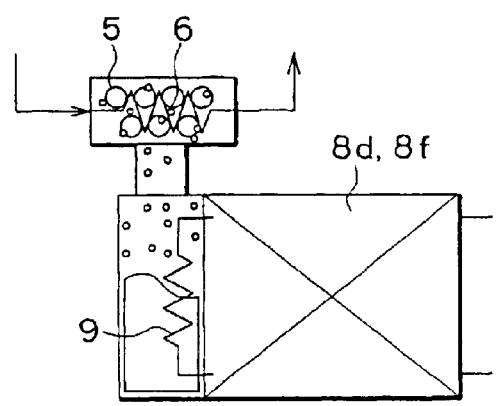
FIG. 25B is a schematic diagram showing a part of the heat storage system including the evaporator according to the twelfth embodiment.

In the above-described tenth and eleventh embodiments, the condensation core 9 is disposed separately from the evaporators 8d, 8f. However, in the twelfth embodiment, as shown in FIGS. 25A, 25B, the condensation core 9 and the evaporators 8d, 8f are integrated with each other. Accordingly, in the twelfth embodiment, the condensation core 9 and the evaporators 8d, 8f can be readily disposed in an air-conditioning case for the vehicle air conditioner.

(Thirteenth Embodiment)

Figure 26:
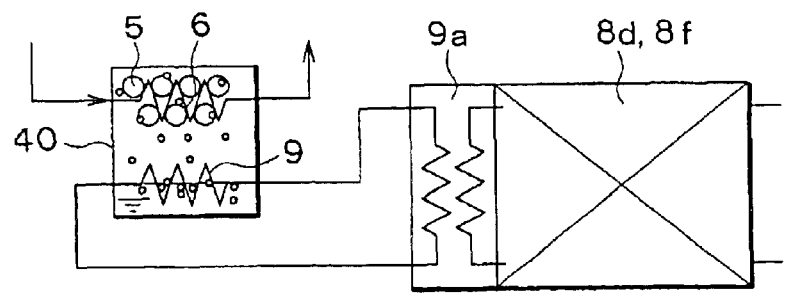
FIG. 26 is a schematic diagram showing a part of a heat storage system including an evaporator according to a thirteenth embodiment of the present invention.

In the thirteenth embodiment, as shown in FIG. 26, a heat exchanger 9a is integrated with the evaporators 8d, 8f. In the heat exchanger 9a, a fluid cooled by the condensation core 9 is heat-exchanged with refrigerant flowing in a refrigerant passage connecting the evaporators 8d, 8f. Accordingly, the heat exchanger 9a and the evaporators 8d, 8f can be readily disposed in the air-conditioning case.

(Fourteenth Embodiment)

Figure 27:
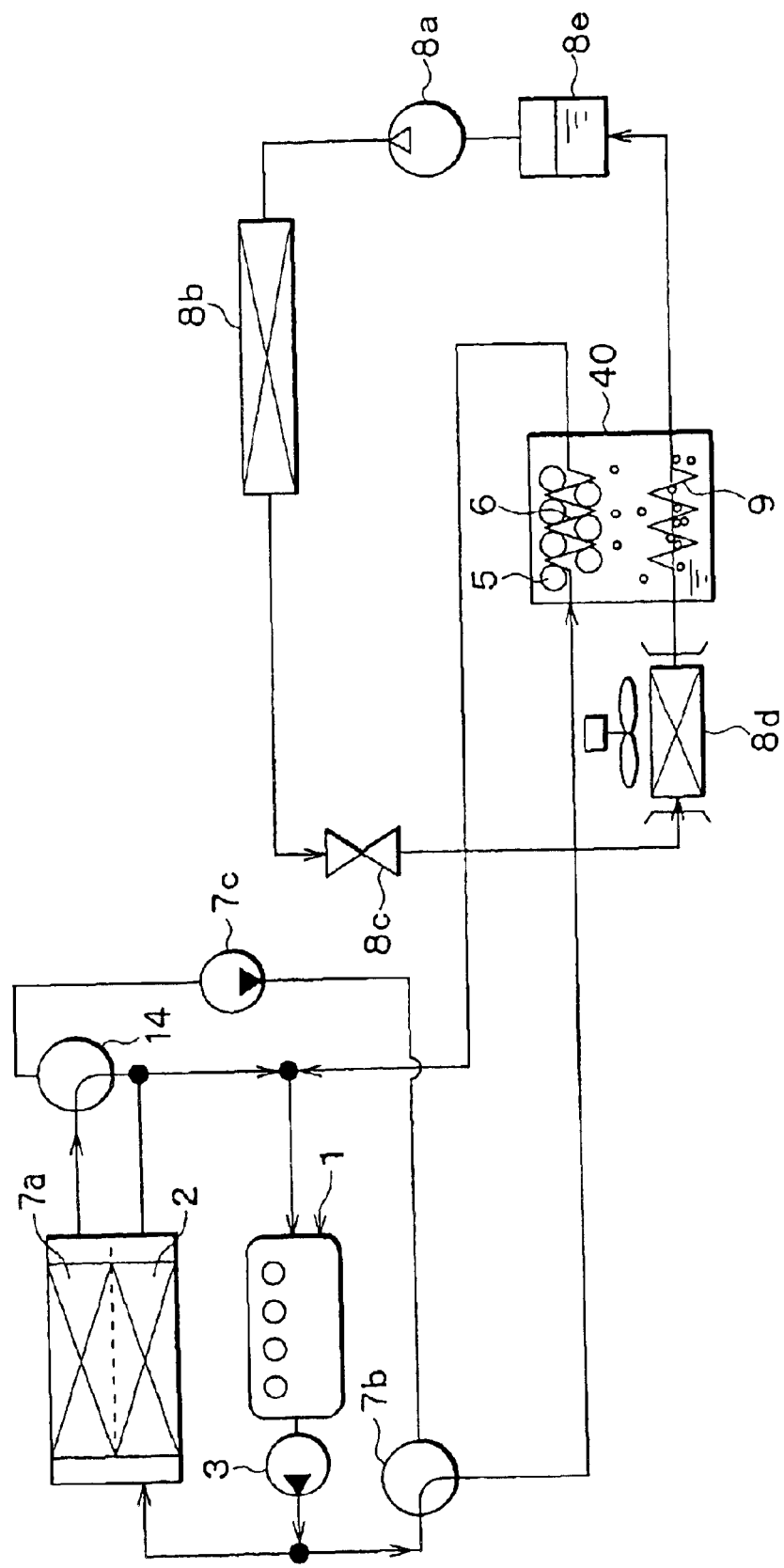
FIG. 27 is a schematic diagram showing a heat storage system according to a fourteenth embodiment of the present invention.
Figure 28:
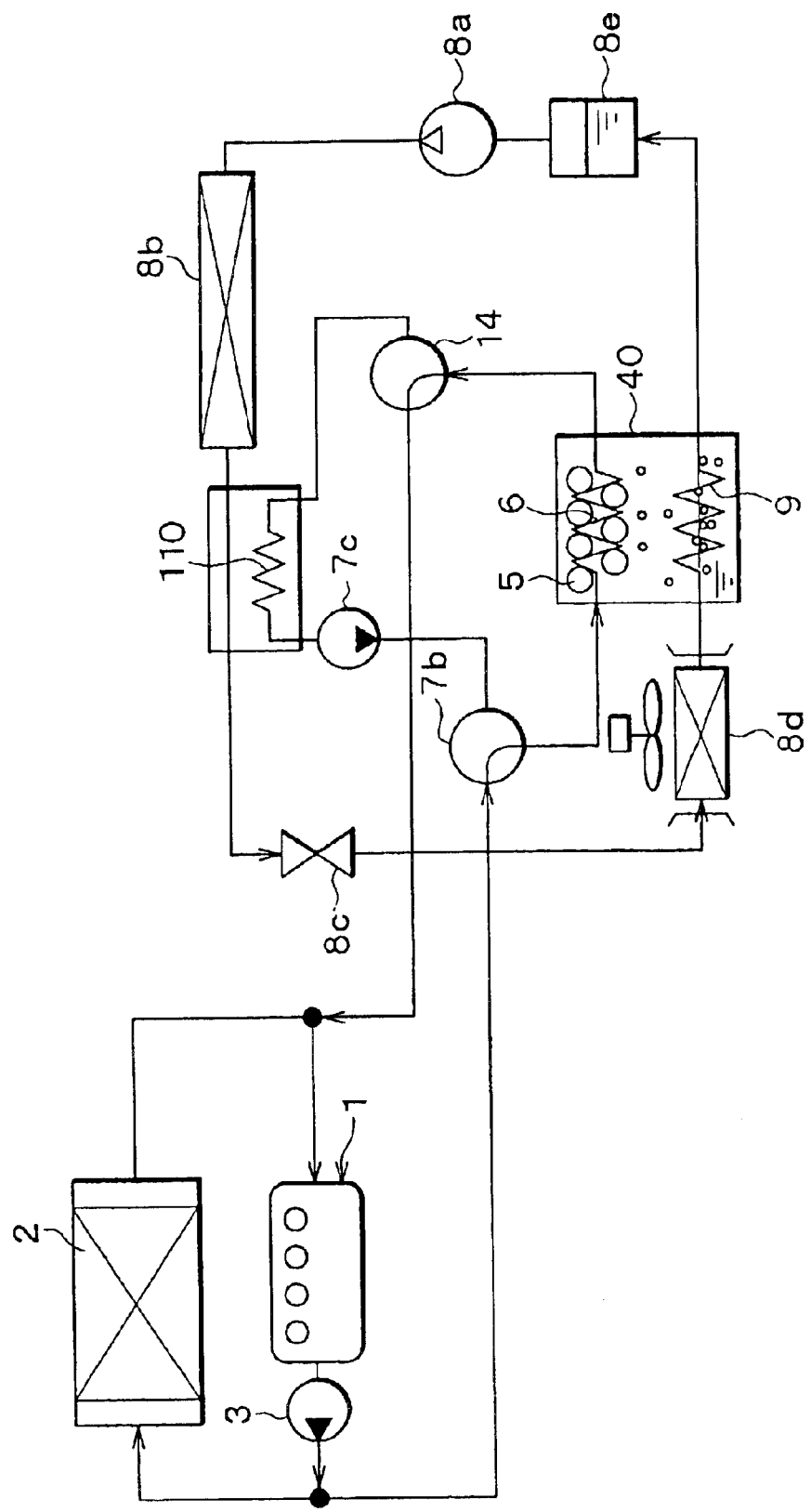
FIG. 28 is a schematic diagram showing a heat storage system according to a modification of the fourteenth embodiment.

In the fourteenth embodiment, as shown in FIGS. 27, 28, the downstream evaporator 8f described in the tenth through thirteenth embodiments is eliminated, and the condensation core 9 is disposed at a downstream refrigerant side of the evaporator 8d. The other parts of the heat storage system in FIG. 27 are similar to those of the above-described tenth embodiment, and the other parts of the heat storage system in FIG. 28 are similar to those of the above-described eleventh embodiment.

(Fifteenth Embodiment)

Figure 29:
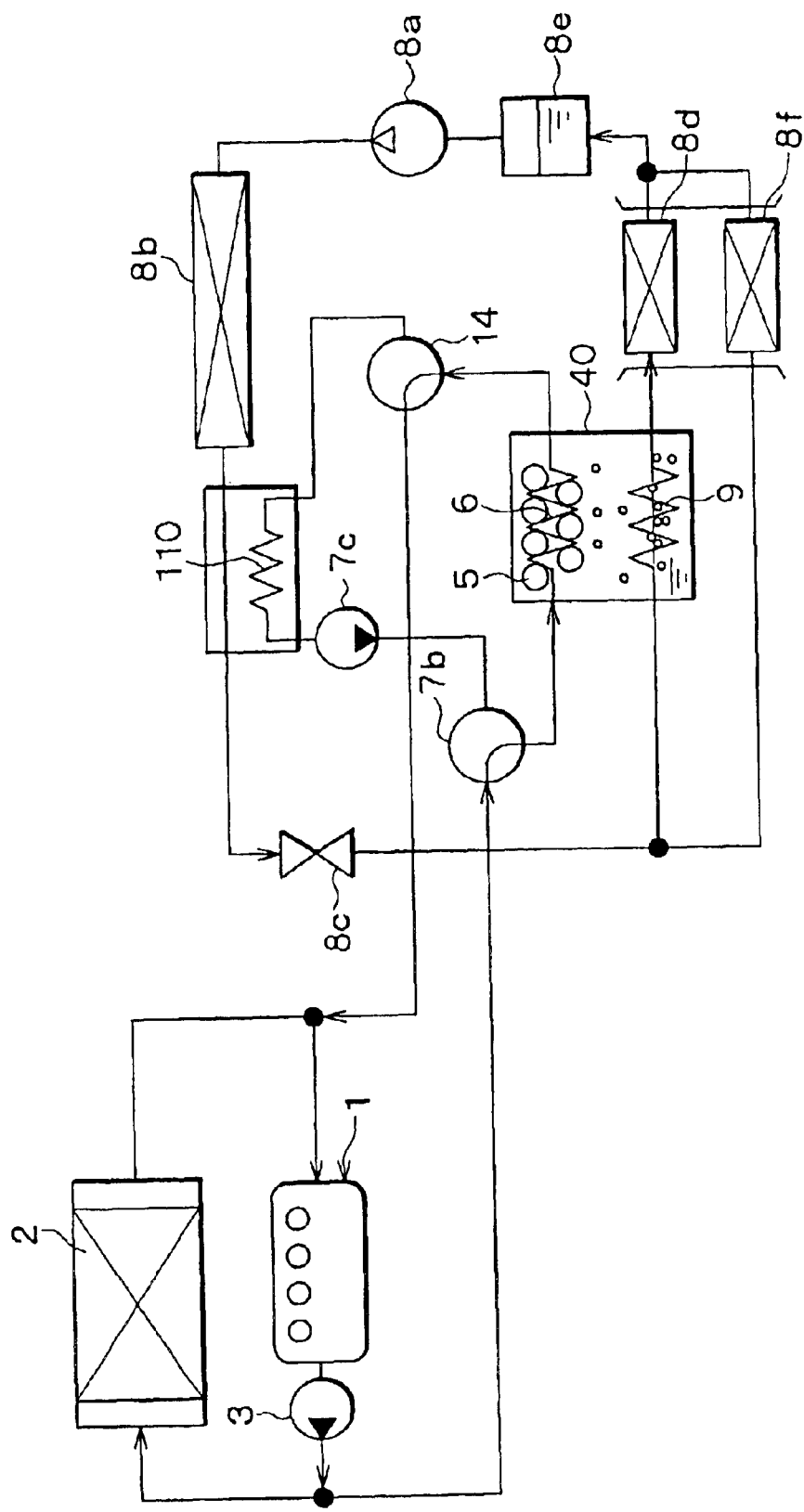
FIG. 29 is a schematic diagram showing a heat storage system according to a fifteenth embodiment of the present invention.
Figure 30:
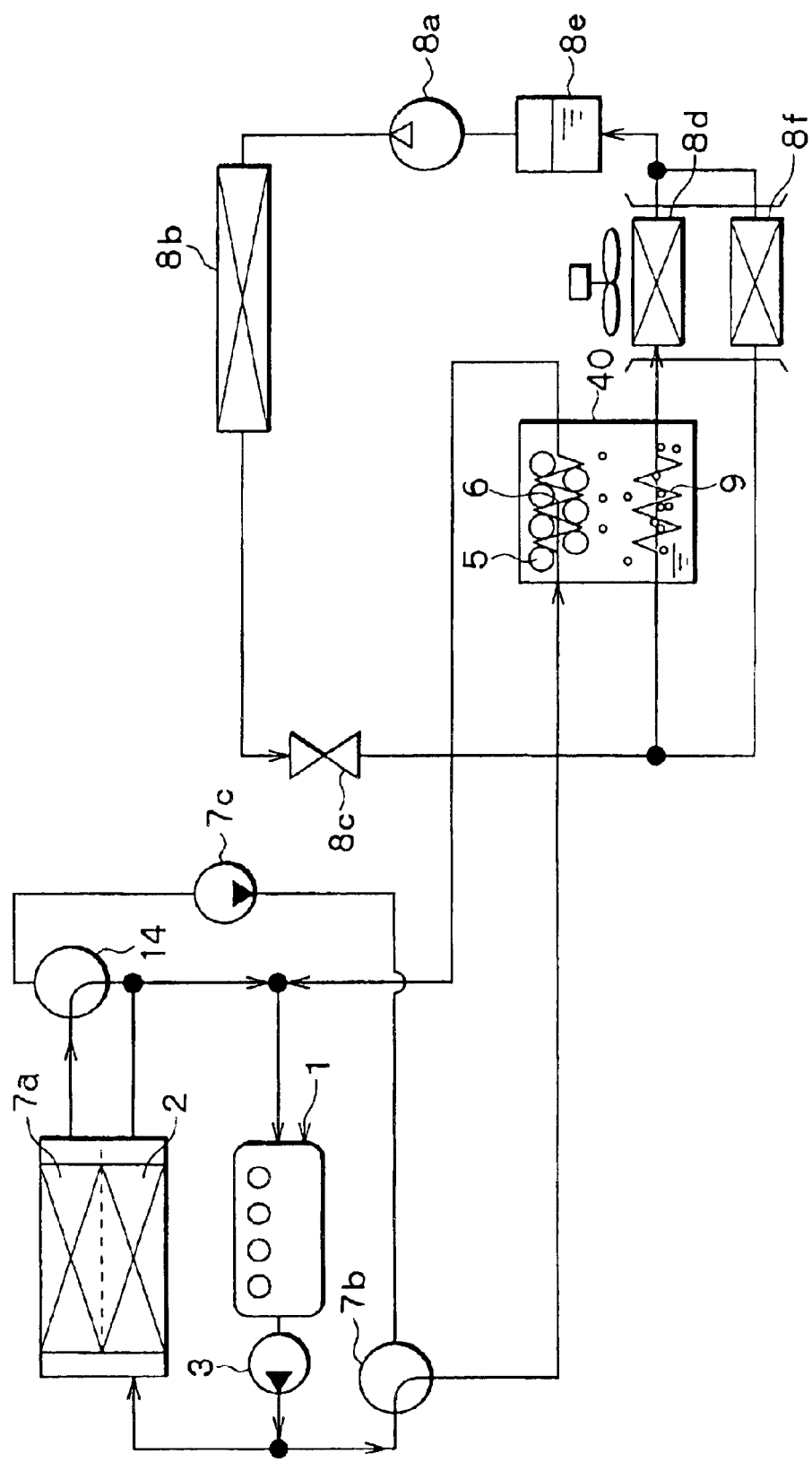
FIG. 30 is a schematic diagram showing a heat storage system according to a modification of the fifteenth embodiment.

In the fifteenth embodiment shown in FIGS. 29 and 30 are modifications of the above-described fourteenth embodiment. As shown in FIGS. 29 and 30, the evaporator 8f and the evaporator 8d are disposed in parallel, with respect to a refrigerant flow. Specifically, the evaporator 8d is disposed downstream from the condensation core 9 in series, in the refrigerant flow. On the other hand, the evaporator 8f is disposed in a bypass refrigerant passage through which refrigerant bypasses the condensation core 9. Preferably, the evaporator 8f is disposed at a downstream air side of the evaporator 8d in the air-conditioning case.

(Other Embodiments)

Although the present invention has been fully described in connection with the preferred embodiments thereof with reference to the accompanying drawings, it is to be noted that various changes and modifications will become apparent to those skilled in the art.

For example, in the above-described first to third embodiments, the condensation core 9 is disposed in the liquid-medium storage chamber 10. However, the liquid-medium storage chamber 10 can be provided separately from a container for containing the condensation core 9 without being limited to this manner. In this case, the first and second valves 12a, 12b are required to be provided in independent from each other.

In the above-described first through third embodiments, the waste heat supplier 6a, the adsorption heat supplier 6b and the cooling portion 6c are constructed with the single adsorption core 6. However, in the present invention, these devices 6a–6c can be provided in independent from each other, without being limited to this manner.

In the above embodiments, water is used as the medium, and a silica gel or a zeolite is adopted as the adsorbent 5. However, water is used as the medium, and a hydration material for generating a hydrate, such as carbon dioxide and methane, may be used as the adsorbent 5, or ammonia may be used as the adsorbent 5, without being limited to this manner. Here, the adsorption of medium means a reversible reaction such as a reversible chemical reaction and a dissolution. That is, if only a substance radiates and absorbs heat due to bonding and separation between a substance and medium, the substance can be used as the adsorbent 5.

In the first to third embodiments, the vapor compression refrigerator 8 (i.e., compressor 8a) is operated in the warm-up/auxiliary-cooling mode. However, in the present invention, the operation of the vapor compression refrigerator 8 may be stopped in the warm-up/auxiliary-cooling mode, without being limited to this manner.

In the above-described embodiments, an adsorption type refrigerator or an ejector type refrigerator may be used as the refrigerator, without limited to the vapor compression refrigerator 8 in the above embodiments. For example, in an electric car, the apparatus requiring the warm-up operation is a motor or an inverter circuit, without being limited to the engine 1 in the above-described first embodiment.

Further, exhaust gas from the engine 1 can be used as a waste heat source without being limited to the heat of the cooling water for cooling the engine 1. In this case, the waste heat supplier 6a is provided as a heat exchanger to be independent from the adsorption heat supplier 6b. When the waste heat supplier 6a and the adsorption heat supplier 6b are provided as a single heat exchanger, a valve for switching a cooling water stream is required. Further, the condensation core 9 can be provided at any position in the vapor compression refrigerator 8, without being limited to a downstream refrigerant side of the condenser 8b in the above-described first embodiment. Generally, the condensation core 9 is provided at a position where a temperature difference between the refrigerant and the medium is large.

Such changes and modifications are to be understood as being within the scope of the present invention as defined by the appended claims.

What is claimed is:

1. A heat storage system for a vehicle, comprising:
    an adsorbent for adsorbing and desorbing medium, the adsorbent having a medium-adsorbing capacity that is reduced in accordance with a temperature increase of the adsorbent, and generating heat when adsorbing gas medium;
    an adsorption chamber for containing the adsorbent therein;
    a waste heat supplier for supplying waste heat generated in the vehicle to the adsorbent;
    an adsorption heat supplier for supplying the heat generated by the adsorbent to an apparatus requiring warm-up operation, the apparatus being mounted in the vehicle;
    a refrigerator for cooling air to be blown into a passenger compartment of the vehicle, the refrigerator including a refrigerant-medium heat exchanger for performing heat-exchange between the medium and refrigerant circulated in the refrigerator;
    a first valve for opening and closing a first passage through the gas medium desorbed from the adsorbent is introduced from the adsorption chamber to the refrigerant-medium heat exchanger;
    a liquid-medium storage chamber for storing liquid medium cooled and condensed in the refrigerant-medium heat exchanger, the liquid medium being heated and vaporized to be gas medium in the refrigerant-medium heat exchanger by absorbing heat;
    a second valve for opening and closing a second passage through which the liquid-medium storage chamber and the adsorption chamber communicate with each other, wherein:
    the first valve opens the first passage for a predetermined time when a temperature of the apparatus is equal to or higher than a predetermined temperature, and closes the first passage after the predetermined time passes; and
    the second valve opens the second passage at least when the temperature of the apparatus is lower than the predetermined temperature.

2. The heat storage system according to claim 1, wherein the refrigerant-medium heat exchanger performs heat-exchange between the refrigerant and the liquid medium stored in the liquid-medium storage chamber when the second valve opens the second passage.

3. The heat storage system according to claim 1, wherein the medium is water.

4. The heat storage system according to claim 1, wherein the adsorbent is a hydration material for generating a hydrate.

5. The heat storage system according to claim 1, wherein the refrigerator is a vapor compression refrigerator.

6. The heat storage system according to claim 1, wherein the waste heat is heat generated by the apparatus after ending the warm-up operation.

7. The heat storage system according to claim 1, further comprising an adsorbent cooling unit that cools the adsorbent when the second valve opens the second passage.

8. The heat storage system according to claim 7, further comprising
    a radiator for performing a heat exchange between cooling water circulating in the apparatus and outside air, wherein:
    the adsorbent cooling unit includes a radiating portion that is integrated with the radiator.

9. The heat storage system according to claim 8, wherein both of the radiator and the radiating portion radiate heat generated by the apparatus to outside air, when an amount of the heat generated from the apparatus is equal to or larger than a predetermined amount.

10. The heat storage system according to claim 1, further comprising
    an adsorbent cooling unit having a cooling portion for cooling the adsorbent, wherein:
    the waste heat supplier, the adsorption heat supplier and the cooling portion are provided to be constructed of a single heat exchanger; and
    the first valve and the second valve are constructed of a single valve for opening and closing the first passage and the second passage.

11. The heat storage system according to claim 1, wherein,
    the refrigerant-medium heat exchanger is disposed to cool the refrigerant in the refrigerator through the medium in a cooling mode.

12. A heat storage system for a vehicle, comprising:
    an adsorbent for adsorbing and desorbing gas medium, the adsorbent desorbing the gas medium when being heated;
    a vapor compression refrigerator for cooling air to be blown into a passenger compartment, the vapor compression refrigerator including a refrigerant-medium heat exchanger for performing heat-exchange between the medium and refrigerant; and
    an adsorption chamber containing therein the adsorbent and the refrigerant-medium heat exchanger, for storing therein liquid medium cooled and condensed by the refrigerant-medium heat exchanger, the liquid medium being heated and vaporized to gas medium by heat from the refrigerant in the refrigerant-medium heat exchanger, wherein,
    the refrigerant-medium heat exchanger is disposed in the adsorption chamber to cool the refrigerant in the refrigerator in a cooling mode.

13. The heat storage system according to claim 12, wherein,
    the refrigerant-medium heat exchanger is disposed to cool refrigerant at a low pressure side after being decompressed in the refrigerator in the cooling mode.

14. The heat storage system according to claim 12, wherein:

the vapor compression refrigerator includes at least two heat exchangers at the low pressure side; and the refrigerant-medium heat exchanger is disposed in a refrigerant passage connecting the two heat exchangers, to cool refrigerant flowing in the refrigerant passage.

15. The heat storage system according to claim 14, wherein the two heat exchangers and the refrigerant-medium heat exchanger are integrated with each other.

16. The heat storage system according to claim 15, wherein:

the refrigerant-medium heat exchanger includes a refrigerant-fluid heat exchanger for performing heat-exchange between a fluid heat-exchanged with the medium in the adsorption chamber and refrigerant flowing in the refrigerant passage between the two heat exchangers; and the refrigerant-fluid heat exchanger and the two heat exchangers are integrated with each other.

17. The heat storage system according to claim 13, wherein the adsorbent is disposed to be cooled by refrigerant at a high pressure side before being decompressed in the refrigerator in the cooling mode.

18. The heat storage system according to claim 12, wherein the refrigerant-medium heat exchanger is disposed to cool refrigerant at a high pressure side before being decompressed in the refrigerator, in the cooling mode.

19. The heat storage system according to claim 12, further comprising:

a fluid passage through which a fluid for cooling and heating the adsorbent flows to the adsorbent;

a switching valve for opening and closing the fluid passage; and a pump for circulating the fluid to the adsorbent.

20. The heat storage system according to claim 12, wherein the adsorbent has a medium-adsorbing capacity that is changed in accordance with a change of relative humidity around the adsorbent.

21. The heat storage system according to claim 12, wherein the adsorbent is disposed to have a substantially constant temperature.

22. The heat storage system according to claim 12, wherein, in a cold storage mode, the adsorbent is heated by waste heat generated in the vehicle while the vehicle is traveling.

* * * * *